(12) United States Patent
Ishii

(10) Patent No.: US 11,550,341 B2
(45) Date of Patent: Jan. 10, 2023

(54) MASS FLOW CONTROL SYSTEM, AND SEMICONDUCTOR MANUFACTURING EQUIPMENT AND VAPORIZER INCLUDING THE SYSTEM

(71) Applicant: Hitachi Metals, Ltd., Tokyo (JP)

(72) Inventor: Mamoru Ishii, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 136 days.

(21) Appl. No.: 16/647,513

(22) PCT Filed: Sep. 25, 2018

(86) PCT No.: PCT/JP2018/035403
§ 371 (c)(1),
(2) Date: Mar. 15, 2020

(87) PCT Pub. No.: WO2019/065611
PCT Pub. Date: Apr. 4, 2019

(65) Prior Publication Data
US 2021/0405667 A1    Dec. 30, 2021

(30) Foreign Application Priority Data

Sep. 29, 2017  (JP) .............................. JP2017-190657

(51) Int. Cl.
G05D 7/06       (2006.01)
G05D 11/13      (2006.01)
G05D 21/02      (2006.01)

(52) U.S. Cl.
CPC ......... G05D 7/0623 (2013.01); G05D 11/132 (2013.01); *G05D 7/0635* (2013.01); *G05D 21/02* (2013.01); *Y10T 137/7761* (2015.04)

(58) Field of Classification Search
CPC ................ G05D 11/132; G05D 7/0635; Y10T 137/7761
(Continued)

(56) References Cited

U.S. PATENT DOCUMENTS 5,730,181 A * 3/1998 Doyle ................ B01D 53/0415
137/487.5
5,865,205 A * 2/1999 Wilmer ................ G05D 7/0635
137/2
(Continued)

FOREIGN PATENT DOCUMENTS

JP    H02268826 A    11/1990
JP    H05104050 A     4/1993
(Continued)

OTHER PUBLICATIONS

ISA/Japan Patent Office, "International Search Report and Written Opinion Regarding International Patent Application No. PCT/JP2018/035403", dated Oct. 24, 2018, p. 12, Published in: JP.

*Primary Examiner* — William M McCalister
(74) *Attorney, Agent, or Firm* — Neugeboren O'Dowd PC

(57) ABSTRACT

In a mass flow control system which comprises a first apparatus that is a mass flow controller, an external sensor that is at least one detection means constituting a second apparatus that is an apparatus disposed outside said first apparatus and at least one control section prepared in either one or both of housings of said first apparatus and said second apparatus, and is configured so as to control a flow rate of fluid flowing through a channel, the control section is configured such that opening of a flow control valve can be controlled based on at least an external signal that is a detection signal output from the external sensor.

13 Claims, 9 Drawing Sheets

(58) Field of Classification Search
USPC ...................................................... 137/487.5
See application file for complete search history.

(56) References Cited

U.S. PATENT DOCUMENTS

| | | | | |
|---|---|---|---|---|
| 6,363,958 | B1* | 4/2002 | Ollivier | G05D 16/0661 137/2 |
| 6,868,869 | B2* | 3/2005 | Olander | C23C 16/4481 118/692 |
| 9,400,004 | B2* | 7/2016 | Monkowski | G01F 25/0053 |
| 9,557,744 | B2* | 1/2017 | Ding | G01F 15/005 |
| 9,910,448 | B2* | 3/2018 | Horwitz | G01F 1/76 |
| 10,534,376 | B2* | 1/2020 | Nishino | G05D 7/0664 |
| 2006/0005882 | A1* | 1/2006 | Tison | G01F 25/0053 137/487.5 |
| 2006/0278276 | A1* | 12/2006 | Tanaka | G01F 25/0038 137/487.5 |
| 2007/0240769 | A1* | 10/2007 | Suzuki | G05D 7/0635 137/487.5 |
| 2009/0183548 | A1* | 7/2009 | Monkowski | G01F 25/0038 73/1.35 |
| 2011/0108126 | A1* | 5/2011 | Monkowski | F16K 31/004 137/12 |
| 2011/0155264 | A1* | 6/2011 | Minami | G05D 11/138 137/467.5 |
| 2014/0083514 | A1* | 3/2014 | Ding | G01F 25/0007 137/12 |
| 2014/0182692 | A1* | 7/2014 | Hirata | G05D 7/0617 137/10 |
| 2015/0007897 | A1* | 1/2015 | Valentine | G01F 5/00 137/487.5 |

FOREIGN PATENT DOCUMENTS

| | | |
|---|---|---|
| JP | H05233069 A | 9/1993 |
| JP | H08064541 A | 3/1996 |
| JP | H08203832 A | 8/1996 |
| JP | 2017-506744 A | 3/2017 |
| JP | 2017076800 A | 4/2017 |
| JP | 6264152 B2 | 1/2018 |
| KR | 10-2006-0040736 A | 5/2006 |
| KR | 10-2011-0074459 A | 6/2011 |

* cited by examiner

MASS FLOW CONTROL SYSTEM, AND SEMICONDUCTOR MANUFACTURING EQUIPMENT AND VAPORIZER INCLUDING THE SYSTEM

BACKGROUND

Field

The present invention relates to a mass flow control system, and semiconductor manufacturing equipment and a vaporizer including the system.

Background

In a manufacturing process of a semiconductor, manufacturing processes, such as thin film formation and microfabrication, are performed in a chamber maintained at the vacuum (or low pressure or reduced pressure) state. Various semiconductor material gases (which may be simply referred to as "material gases" hereafter) are introduced into this chamber depending on a configuration of a semiconductor device to be manufactured, etc., for example. If necessary, a mixed gas of an inert gas, such as argon, helium and nitrogen, and a material gas, etc. may be used, for example.

FIG. 1 is a schematic view for exemplifying structure of general semiconductor manufacturing equipment according to a prior art. In the semiconductor manufacturing equipment shown in FIG. 1, a material gas 1, a material gas 2 and a material gas 3 can be switched as needed and can be supplied into a chamber. Moreover, in each case, flow rates of the material gases can be measured and controlled respectively by mass flow controllers for the material gases (MFC-1 to MFC-3).

Moreover, when using, as the material gas, a material which is in a liquid phase state or a solid state at ordinary temperature, the material can be heated by using an apparatus referred to as a "vaporizer" to generate a vaporized gas, and the generated vaporized gas can be supplied to (a chamber as a reactor of) semiconductor manufacturing equipment. As procedures for generating a vaporized gas in a vaporizer, various techniques are known. For example, as a technique for generating a vaporized gas from a liquid material used in a plasma CVD technique, what is called a "bubbling technique" is widely used conventionally. This bubbling technique is a technique in which a carrier gas is introduced at a controlled flow rate under a liquid level in a tank (vaporizing tank) that a vaporizer comprises and a mixed gas of the carrier gas and a vaporized gas is taken out of an exhaust hole of the vaporizing tank while keeping constant temperature of a liquid material stored in the vaporizing tank and pressure of the vaporized gas (see, e.g., Japanese Patent Application Laid-Open (kokai) No. H08-64541 and Japanese Patent Application Laid-Open (kokai) No. 2017-76800).

FIG. 2 is a schematic view for exemplifying a structure of a general vaporizer according to a prior art. The vaporizer is constituted by a mass flow controller for a carrier gas, a vaporizing tank, and a mass flow meter for a mixed gas. A flow rate Q1 of a carrier gas is measured and controlled by the mass flow controller (MFC) for a carrier gas, and a flow rate Q2 of a mixed gas of the carrier gas and a vaporized gas (material gas) is measured by the mass flow meter (MFM) for the mixed gas. A flow rate Qs of the vaporized gas can be calculated by subtracting the flow rate Q1 of the carrier gas from the flow rate Q2 of the mixed gas.

As mentioned above, a flow rate of a gas, such as a material gas, a vaporized gas and an inert gas, supplied to a chamber (which may be referred to as a "process gas" hereafter) can be controlled by a mass flow controller. A mass flow controller comprises a flow sensor which measures a flow rate of a target process gas, a flow control valve which controls the flow rate of the process gas, and a control circuit which generates a control signal having a property (for example, magnitude of voltage or electric current, etc.) determined based on an output signal of the flow sensor. Opening of the flow control valve is controlled based on the property of the control signal. Therefore, the mass flow controller can control the flow rate of the carrier gas such that the flow rate of the process gas approaches a predetermined target value using the flow control valve. On the other hand, the mass flow meter which measures the flow rate of the process gas comprises the flow sensor which measures the flow rate of the target process gas.

As mentioned above, a mass flow controller according to a prior art comprises a flow sensor inside the apparatus, and a property of a control signal given to a flow control valve is determined based on an output signal of the flow sensor. Namely, in such a mass flow controller, all a flow sensor, a flow control valve and a control circuit are included in its interior, and an independent self-contained mass flow control system is built as the whole apparatus. Therefore, for example, in a case where a mass flow controller needs to be exchanged for the purpose of repair and inspection of the apparatus, etc., such a mass flow controller is convenient since the mass flow controller can be exchanged whole.

However, in some use modes, there are various subjects which will be enumerated below in the independent self-contained mass flow control system according to a prior art. For example, in the semiconductor manufacturing equipment shown in FIG. 1, when switching a process gas from the material gas 1 to the material gas 2, supply of the material gas 1 is stopped first, a channel of the material gas 1 and the inside of the chamber is purged with a purge gas, and thereafter supply of the material gas 2 is started. In order to complete the purging quickly, it is desirable to increase the flow rate of the purge gas via the channel of the material gas 1 as much as possible.

However, in general, a flow rate required for each material gas is very small in a semiconductor manufacturing process. For this reason, a flow rate range (bin size) of the mass flow controller (MFC-1) interposed in the channel of the material gas 1 is designed to be very small value, too. In other words, the maximum value of the flow rate that the flow sensor which the mass flow controller (MFC-1) comprises can detect (which may be referred to as the "maximum detection value" hereafter) is very small as compared with the maximum detection value of the flow sensor which the mass flow controller (MFC-0) for a purge gas comprises. Therefore, when the mass flow controller (MFC-1) is configured so as to perform independent self-contained flow control like the mass flow control system according to the prior art, it is difficult to complete a purging quickly since the maximum flow rate of the purge gas cannot exceed the maximum detection value of the mass flow controller (MFC-1).

Moreover, in the vaporizer shown in FIG. 2, for example, the flow rate Qs of the vaporized gas can be calculated by subtracting the flow rate Q1 of the carrier gas measured by the mass flow controller (MFC) for the carrier gas from the flow rate Q2 of the mixed gas measured by the mass flow meter (MFM) for the mixed gas, as mentioned above. However, the flow rate Q1 of the carrier gas is measured only by the mass flow controller (MFC) for the carrier gas, and independent self-contained flow control is performed. Namely, control of the flow rate Q1 of the carrier gas is not performed based on the flow rate Qs of the vaporized gas and/or the flow rate Q2 of the mixed gas which are proper objects (targets) to be controlled. Therefore, the control based on the flow rate Qs of the vaporized gas and/or the flow rate Q2 of the mixed gas supplied by a vaporizer cannot be performed only by the mass flow controller according to the prior art.

Furthermore, in flow rate calibration of a mass flow controller, a mass flow controller to be calibrated and a calibrated mass flow meter are interposed in series in a channel of a fluid (gas), and the mass flow controller is adjusted such that flow rates measured by flow sensors which the both comprise coincide with each other. Specifically, gain of an amplifier of a control circuit which the mass flow controller comprises, etc. is adjusted through a means of communication which the mass flow controller comprises, using a separate control device such as a personal computer (PC), etc., for example. Thus, since a separate flow sensor and control device need to be added in flow rate calibration of a mass flow controller, there is a possibility to cause problems, such as complication of a facility required for flow rate calibration, complication of an operation, and increase in costs.

In addition, it has been known that it is important to keep constant pressure inside a chamber of semiconductor manufacturing equipment and a vaporizing tank of a vaporizer (these may be generically referred to as a "tank" hereafter) in order to more accurately control a flow rate of a fluid in the semiconductor manufacturing equipment or the vaporizer. For this reason, a pressure sensor which measures pressure in the tank and a PC as a control device for controlling a flow rate (amount of supply) of a fluid based on pressure measured by the pressure sensor, etc. may be prepared, or a mechanism for pressure control, such as a pressure control valve, etc. may be prepared. Also in this case, there is a possibility to cause problems, such as complication of configurations of the semiconductor manufacturing equipment and the vaporizer and increase in costs.

Moreover, a manufacturing process in which temperature in a tank is lowered at a predetermined temperature falling velocity may be included in a semiconductor manufacturing process. This manufacturing process can be performed by introducing a purge gas into the tank at a predetermined flow rate, for example. However, when the temperature falling velocity needs to be controlled more strictly, it is necessary to more accurately control the flow rate of the purge gas such that the temperature in the tank measured by a temperature sensor disposed in the tank falls at a predetermined temperature falling velocity. Also when performing the above-mentioned control in semiconductor manufacturing equipment which uses a mass flow controller according to a prior art, it is necessary to add a separate control device such as a PC, and there is a possibility to cause problems, such as complication of a configuration of semiconductor manufacturing equipment and increase in costs.

Furthermore, flow control depending on concentration of a material gas in a mixed gas and concentration of a specific component in a liquid material stored in a vaporizing tank, for example, may be required. Also in this case, it is necessary to add a separate control device for performing control depending on the concentration measured by a concentration sensor, and there is a possibility to cause problems, such as complication of configurations of semiconductor manufacturing equipment and a vaporizer and increase in costs.

As mentioned above, a mass flow controller according to a prior art is configured so as to perform independent self-contained control. Therefore, it is necessary to add a control loop of a different system including a separate control device, such as a PC, etc., in order to perform flow control based on a detection signal from a detection means disposed outside the mass flow controller in semiconductor manufacturing equipment and a vaporizer, etc., for example, and there is a possibility to cause problems, such as complication of the configuration and increase in costs. Moreover, since it is necessary to perform operation processing (arithmetic processing) based on a detection signal, etc. outside the mass flow controller, there is also a possibility to cause problems, such as degradation of response speed and increase of malfunction, for example.

SUMMARY

An aspect may be characterized as a mass flow control system. The mass flow control system includes a channel through which a fluid flows, a first apparatus that is a mass flow controller which comprises a flow control valve interposed in said channel and configured such that opening of the flow control valve is controlled based on a property of a control signal. The mass flow control system also includes a second apparatus that is an apparatus disposed outside said first apparatus and at least one control section prepared in either one or both of housings of said first apparatus and said second apparatus. The first apparatus comprises an internal sensor that is a flow sensor, and the control section is configured to be able to perform a first mode that is an operation mode in which the property of the control signal is specified based on an internal signal that is a detection signal output from said internal sensor. The mass flow control system is configured to control a flow rate of the fluid flowing through the channel, and the second apparatus includes an external sensor that is at least one detection means, and the control section is configured to be able to switch an operation mode between a second mode that is an operation mode in which the property of said control signal is specified based on at least an external signal that is a detection signal output from said external sensor and said first mode and perform the operation mode.

Another aspect may be characterized as a vaporizer including the mass flow control system.

Yet another aspect may be characterized as a semiconductor manufacturing equipment.

DETAILED DESCRIPTION

Figure 1:
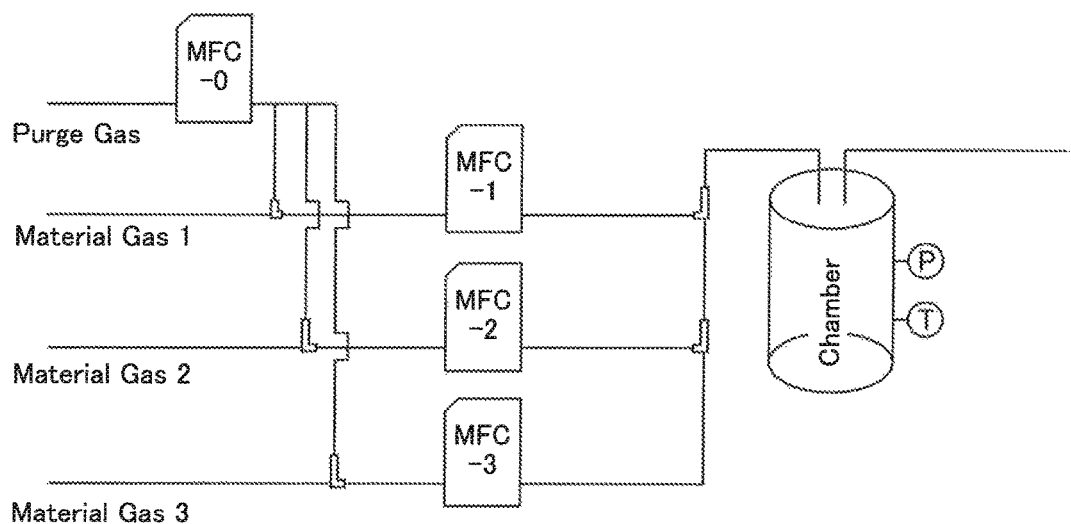
FIG. 1 is a schematic view for showing a configuration of semiconductor manufacturing equipment according to a prior art.
Figure 2:
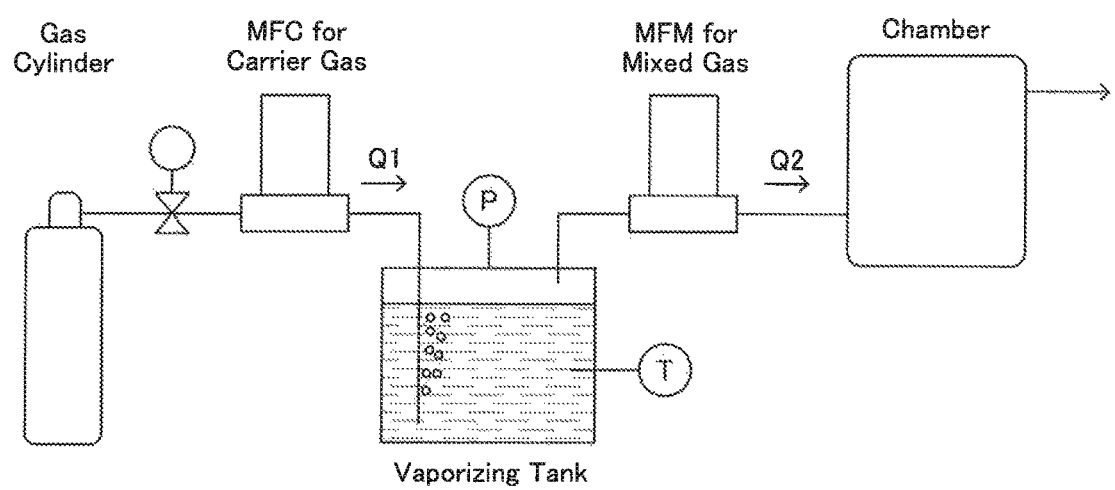
FIG. 2 is a schematic view for showing a configuration of a vaporizer according to a prior art.

Modes (embodiments) for carrying out the present invention will be explained in detail below, referring to drawings. However, the embodiments of the present invention indicated below are just only exemplifications, and embodiments of the present invention are not limited to what is described below.

Technical Problem

As mentioned above, a mass flow controller according to a prior art is configured so as to perform independent self-contained flow control. For this reason, in the mass flow controller according to a prior art, it is difficult to attain effects, such as quick purging, more accurate flow control, simple flow rate calibration, flow control based on pressure and/or temperature in a tank, and flow control based on concentration of a material in a fluid, etc., without adding a separate control device, etc. Namely, a technology which can solve the above-mentioned subjects without adding a separate control device, etc. has been demanded in the art.

Solution to Problem

In view of the above-mentioned subjects, as a result of wholehearted research, the present inventor has found that the above-mentioned subjects can be solved without adding a separate control device, etc. by constituting a mass flow controller such that opening of a flow control valve can be controlled based on a detection signal from an external detection means.

Namely, a mass flow control system according to the present invention (which may be referred to as a "present invention system" hereafter) is a mass flow control system comprising a channel through which a fluid flows, a first apparatus, a second apparatus, and at least one control section and configured so as to control a flow rate of the fluid flowing through the channel. The first apparatus is a mass flow controller which comprises a flow control valve interposed in the channel and configured such that opening of the flow control valve is controlled based on a property of a control signal. The second apparatus is an apparatus disposed outside the first apparatus, and comprises an external sensor that is at least one detection means. The control section is prepared in either one or both of housings of the first apparatus and the second apparatus.

Furthermore, in the present invention system, the control section is configured such that the property of the control signal can be specified based on at least an external signal that is a detection signal output from the external sensor.

Moreover, semiconductor manufacturing equipment according to the present invention is semiconductor manufacturing equipment including the mass flow control system according to the present invention (present invention system) as mentioned above. Furthermore, a vaporizer according to the present invention is a vaporizer including the mass flow control system according to the present invention (present invention system) as mentioned above.

Advantageous Effects of Invention

In accordance with the mass flow control system according to the present invention (present invention system), effects, such as quick purging, more accurate flow control, simple flow rate calibration, flow control based on pressure or temperature in a tank, or flow control based on concentration of a material in the fluid, etc., can be attained without adding a separate control device, including hardware, such as a personal computer (PC), etc.

Other objectives, other features and accompanying advantages of the present invention will be easily understood from the following explanation about respective embodiments of the present invention, which will be described referring to drawings.

First Embodiment

Hereafter, a mass flow control system according to a first embodiment of the present invention (which may be referred to as a "first system" hereafter) will be explained, referring to drawings.
<Configuration>

Figure 3:
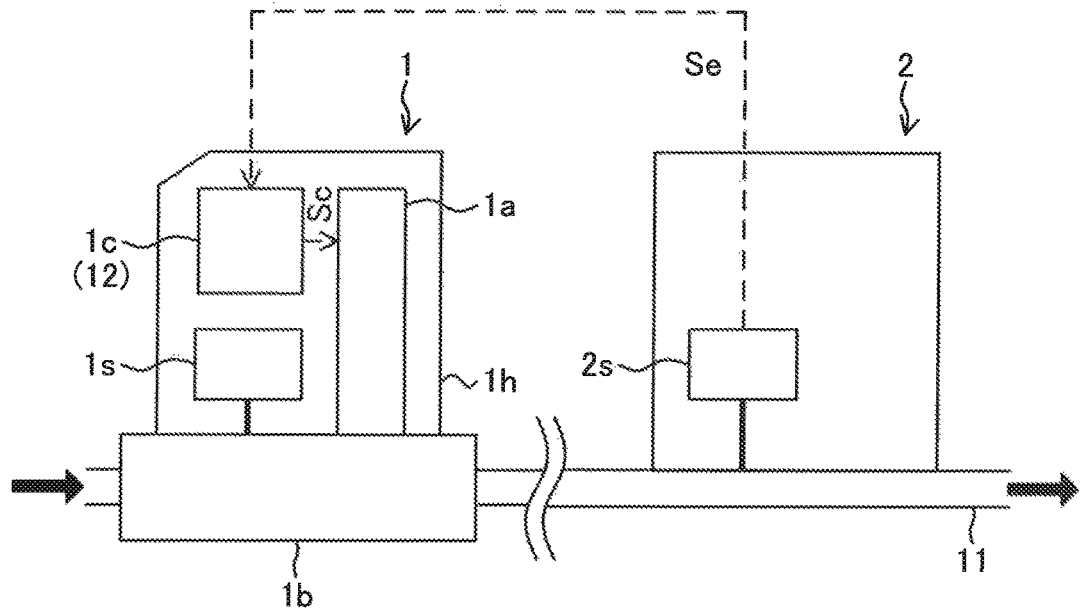
FIG. 3 is a schematic view for showing an example of a configuration of a mass flow control system according to a first embodiment of the present invention (first system).

For example, as shown in FIG. 3, the first system 10 is a mass flow control system comprising a channel 11 through which a fluid flows, a first apparatus 1, a second apparatus 2, and at least one control section 12 and configured so as to control a flow rate of the fluid flowing through the channel 11.

The first apparatus 1 is a mass flow controller which comprises a flow control valve (no shown) interposed in the channel 11 and configured such that opening of the flow control valve is controlled based on a property of a control signal Sc. The second apparatus 2 is an apparatus disposed outside the first apparatus 1, and comprises an external sensor 2s that is at least one detection means. In addition, although not shown in FIG. 3, the first system 10 may further comprise other constituents, such as a chamber and a vaporizing tank, a joining part with another channel and a branching part, and an on-off valve and a flow regulating valve, etc., for example, between the first apparatus 1 and the second apparatus 2 and/or in another region.

In the first apparatus 1 which the first system 10 comprises, a flow control valve is disposed inside the base 1b, and a flow sensor (internal sensor) 1s, a control circuit 1c, and an actuator 1a which changes opening of the flow control valve are disposed inside a housing 1h. Generally, in a usual operation mode of the first apparatus 1, the control circuit 1c is configured so as to control the actuator 1a based on a detection signal (internal signal Si) output from the flow sensor 1s to bring the flow rate of the fluid close to a predetermined target value.

The external sensor 2s may be one of a plurality of constituents which constitute the second apparatus 2, or may be the sole constituent which constitutes the second apparatus 2 (namely, the external sensor 2s itself may be the second apparatus 2). Moreover, as will be mentioned later in detail, the external sensor 2s may be any of a flow sensor, a pressure sensor, a temperature sensor, or a concentration sensor. Specifically, the external sensor 2s may be a flow sensor which another mass flow controller or mass flow meter other than the first apparatus 1 of the first system 10 comprises, for example. Alternatively, the external sensor 2s may be a pressure sensor, a temperature sensor or a concentration sensor disposed in a chamber or vaporizing tank (not shown) which the first system 10 comprises, for example. The second apparatus 2 may comprise a flow control valve (not shown) similar to the flow control valve which the first apparatus 1 comprises.

Figure 4:
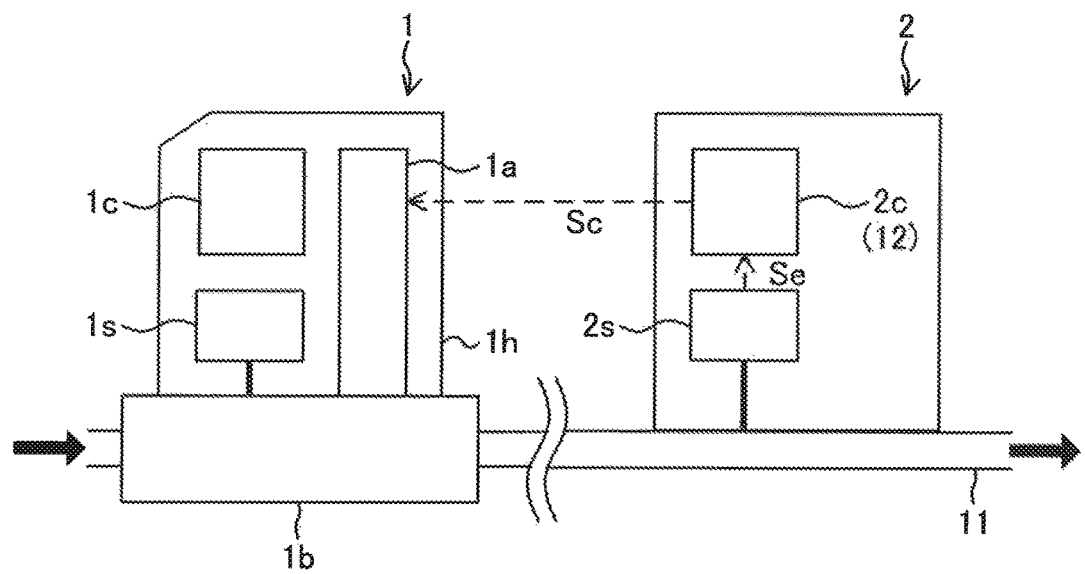
FIG. 4 is a schematic view for showing an example of a configuration of one modification of the first system.
Figure 5:
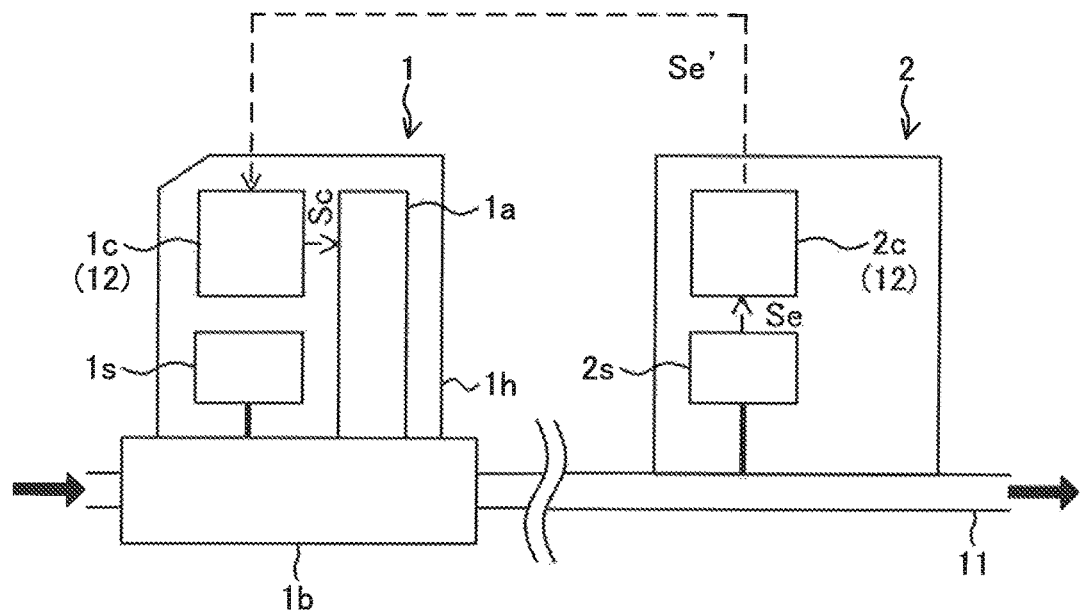
FIG. 5 is a schematic view for showing another example of a configuration of another modification of the first system.

The control section 12 is prepared in either one or both of housings of the first apparatus 1 and the second apparatus 2. Specifically, the control section 12 which the first system 10 comprises may be constituted by only the control circuit 1c which the first apparatus 1 comprises as shown in FIG. 3, may be constituted by only the control circuit 2c which the second apparatus 2 comprises as shown in FIG. 4, or may be constituted by the control circuit 1c and the control circuit 2c as shown in FIG. 5. In addition, although an external signal Se that is a detection signal output from the external sensor 2s is first transmitted to the control circuit 2c, and thereafter is transmitted to the control circuit 1c in the example shown in FIG. 5, processing order of the external signal Se by the control circuit 1c and the control circuit 2c is not necessarily limited to this. Typically, the first system 10 comprises a means of communication (not shown) configured so as to transmit the external signal 2s to the control section 12 (including the control circuit 1c and/or the control circuit 2c) from the external sensor 2s.

In addition, the control circuit 1c and the control circuit 2c are electronic control circuitries (ECU: Electronic Control Unit) which comprise as a main component a microcomputer including a CPU, an ROM, an RAM and an interface, etc. In the following explanation, a case where the control section 12 which the first system 10 comprises is constituted by only the control circuit 1c will be explained, unless otherwise stated.

Furthermore, in the first system 10, the control section 12 (the control circuit 1c) is configured such that the property of the control signal Sc can be specified based on at least the external signal Se that is a detection signal output from the external sensor 2s. On the other hand, as mentioned above, the flow control valve is constituted such that the opening thereof is controlled based on a property of the control signal Sc. In the first system 10, the opening of the flow control valve is controlled based on the property of the control signal Sc transmitted to the actuator 1a from the control circuit 1c as the control section 12. Here, as the property of the control signal Sc, magnitude of voltage or electric current of the control signal Sc can be mentioned, for example.

Moreover, as mentioned above, in the first system 10, the control section 12 (control circuit 1c) specifies the property of the control signal Sc based on at least the external signal Se that is a detection signal output from the external sensor 2s. Therefore, it is desirable that the detection signal output from the external sensor 2s conforms the same protocol as the detection signal output to the control circuit 1c (control section 12) from the internal sensor 1s in the first apparatus 1. However, when the protocols which these signals conform are different from each other, the control circuit 1c (control section 12) may be configured so as to convert the detection signal output from the external sensor 2s such that the detection signal output from the external sensor 2s conforms the protocol which the detection signal output from the internal sensor 1s follows.

Furthermore, a conversion factor (CF) of the fluid as a detection target of the internal sensor 1s which the first apparatus 1 comprises is different from that of the fluid as a detection target of the external sensor 2a which the second apparatus 2 comprises, it is necessary to reflect the difference between these CFs reflect in the property of the control signal Sc. Such processing can be also performed by the control section 12 (control circuit 1c) which the first system 10 comprises.

<Effects>

As mentioned above, in the first system 10, the opening of the flow control valve can be controlled based on the detection signal (external signal Se) output from the external sensor 2s. Therefore, in accordance with the first system 10, effects, such as quick purging, more accurate flow control, simple flow rate calibration, flow control based on pressure or temperature in a tank, or flow control based on concentration of a material in a fluid, etc., can be attained without adding a separate control device, etc.

Second Embodiment

Hereafter, a mass flow control system according to a second embodiment of the present invention (which may be referred to as a "second system" hereafter) will be explained.
<Configuration>

The second system is a mass flow control system which has the same configuration as the above-mentioned first system 10, wherein the external sensor is a flow sensor. A configuration of the flow sensor as the external sensor 2s is not particularly limited as long as it is possible to measure the flow rate of the fluid flowing through the channel which the second system comprises. As a specific example of such a flow sensor, a thermal type flow sensor, a pressure type flow sensor and a differential pressure type flow sensor, etc. can be mentioned, for example.

Moreover, the fluid whose flow rate is measured by the flow sensor as the external sensor 2s may be a fluid flowing on the upstream side of the first apparatus 1 which the second system comprises, or may be a fluid flowing on the downstream side thereof. Namely, the external sensor 2s can be disposed at a point where can flow rate of the fluid whose flow rate is to be controlled by the flow control valve which the first apparatus 1 comprises in the second system.
<Effects>

As mentioned above, in the second system, the opening of the flow control valve can be controlled based on the detection signal (external signal Se) output from the flow sensor as the external sensor 2s. Therefore, when the maximum detection values of the internal sensor 1s and the external sensor 2s are different from each other, the flow rate of the fluid can be controlled in a flow rate range (bin size) different from that in a usual operation mode based on the detection signal output from the internal sensor 1s, using the flow control valve which the first apparatus 1 comprises. In accordance with such a function, purging with a purge gas as mentioned above can be performed quickly, for example.

Moreover, in the channel of the fluid, when (the second apparatus 2 comprising) the external sensor 2s is disposed at a position closer to a supply destination of the fluid than to the first apparatus 1, more accurate flow control based on the flow rate of the fluid supplied to the supply destination of the fluid can be performed. Furthermore, in flow rate calibration of the mass flow controller, the external sensor 2s can be used as (a flow sensor constituting) a mass flow meter for a calibration.

As mentioned above, in accordance with the second system, effects, such as quick purging, more accurate flow control, or simple flow rate calibration, etc., can be easily attained without adding a separate control device, etc.

Third Embodiment

Hereafter, a mass flow control system according to a third embodiment of the present invention (which may be referred to as a "third system" hereafter) will be explained, referring to drawings.
<Configuration>

Figure 6:
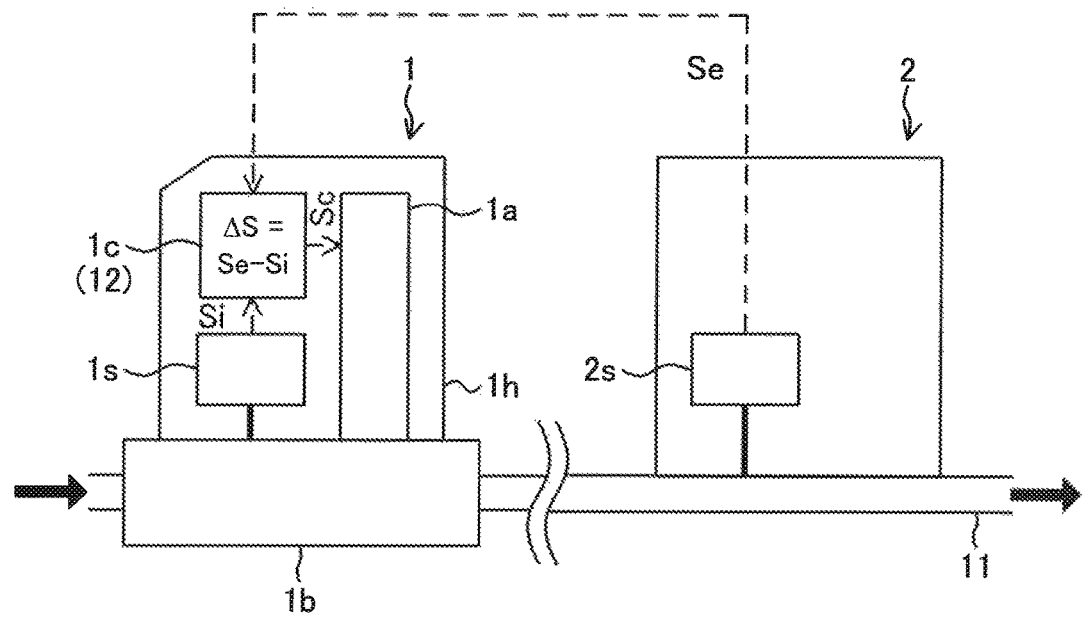
FIG. 6 is a schematic view for showing an example of a configuration of a mass flow control system according to a third embodiment of the present invention (third system).

For example, as shown in FIG. 6, the third systems 30 is a mass flow control system which has the same configuration as the above-mentioned second system, wherein the first apparatus comprises an internal sensor 1s that is a flow sensor separate from the external sensor 2s. A configuration of the flow sensor as the internal sensor 1s is not particularly limited as long as it is possible to measure the flow rate of the fluid flowing through the channel 11 in which the first apparatus 1 is interposed. As a specific example of such a flow sensor, a thermal type flow sensor, a pressure type flow sensor and a differential pressure type flow sensor, etc. can be mentioned, for example.

Furthermore, the control section 12 is configured such that the property (for example, magnitude of voltage or electric current, etc.) of the control signal Sc can be specified based on magnitude of difference $\Delta S$ (=Se−Si) between an internal signal Si that is a detection signal output from the internal sensor 1s and the external signal Se. Calculation of the difference $\Delta S$ (=Se−Si) between the internal signal Si and the external signal Se can be performed by the control circuit 1c which constitutes the control section 12, etc., for example. The control section 12 can be configured so as to perform various calculations (operations) besides the above-mentioned calculation. As a specific example of such calculations, calculations for converting difference in a full scale, difference in a conversion factor and difference in an output format between the internal signal Si and the external signal Se, etc. can be mentioned, for example. However, such calculations are not limited to these.
<Effects>

As mentioned above, in the third system 30, the control section 12 is configured such that the property of the control signal Sc can be specified based on magnitude of the difference $\Delta S$ (=Se−Si) between the internal signal Si and the external signal Se. Namely, in the third system 30, the opening of the flow control valve can be controlled based on the above-mentioned difference $\Delta S$. Therefore, in accordance with the third system 30, in a case where a vaporizer or a joining part with another channel for supplying another material, etc. is disposed between the first apparatus 1 and (the second apparatus 2 comprising) the external sensor 2s, the flow rate of the process gas can be controlled more accurately to bring the flow rate of the material added in the vaporizer or the joining part close to a predetermined target value.

Fourth Embodiment

Hereafter, a mass flow control system according to a fourth embodiment of the present invention (which may be referred to as a "fourth system" hereafter) will be explained.

As mentioned above, in accordance with the present invention system including the first system and the second system, effects, effects, such as quick purging, more accurate flow control, simple flow rate calibration, flow control based on pressure or temperature in a tank, or flow control based on concentration of a material in a fluid, etc., can be attained without adding a separate control device, etc.
<Configuration>

Then, the fourth system is configured as a mass flow control system which can perform a flow rate calibration simply, without adding a separate control device, etc. Specifically, the first apparatus is the above-mentioned second system, wherein the first apparatus comprises an internal sensor that is a flow sensor separate from the external sensor like the above-mentioned third system. A configuration of the flow sensor as the internal sensor is not particularly limited as long as it is possible to measure the flow rate of the fluid flowing through the channel in which the first apparatus 1 is interposed, as explained about the above-mentioned third system. As a specific example of such a flow sensor, a thermal type flow sensor, a pressure type flow sensor and a differential pressure type flow sensor, etc. can be mentioned, for example.

Furthermore, in the fourth system, the control section is configured such that, on the basis of a first sensor that is either one of the internal sensor and the external sensor, flow rate calibration of a second sensor that is a sensor other than the first sensor of the internal sensor and the external sensor can be performed. As the first sensor used as the basis of the flow rate calibration, the sensor which outputs the detection signal correctly corresponding to the flow rate of the fluid flowing through the channel is adopted between the internal sensor and the external sensor. In other words, the first sensor is the flow sensor constituting a combination of a predetermined control circuit and a flow sensor adjusted (calibrated) such that the flow rate of the fluid flowing through the channel can be detected accurately, between the internal sensor and the external sensor.

In flow rate calibration, the predetermined control circuit which processes the detection signal output from the second sensor is adjusted (calibrated) such that the deviation between the flow rate detected based on the detection signal output from such a first sensor and the flow rate detected based on the detection signal output from the second sensor becomes smaller than a predetermined threshold (namely, the both substantially coincide with each other). However, in flow rate calibration, the flow rate itself of the fluid detected based on the detection signal output from the first sensor and the flow rate itself of the fluid detected based on the detection signal output from the second sensor do not always need to substantially coincide with each other. Specifically, for example, strength of the signal based on "the detection signal output from the first sensor" output from an amplifier included in a predetermined control circuit and the strength of the signal based on "the detection signal output from the second sensor" output from an amplifier included in a predetermined control circuit may substantially coincide with each other.

Figure 7:
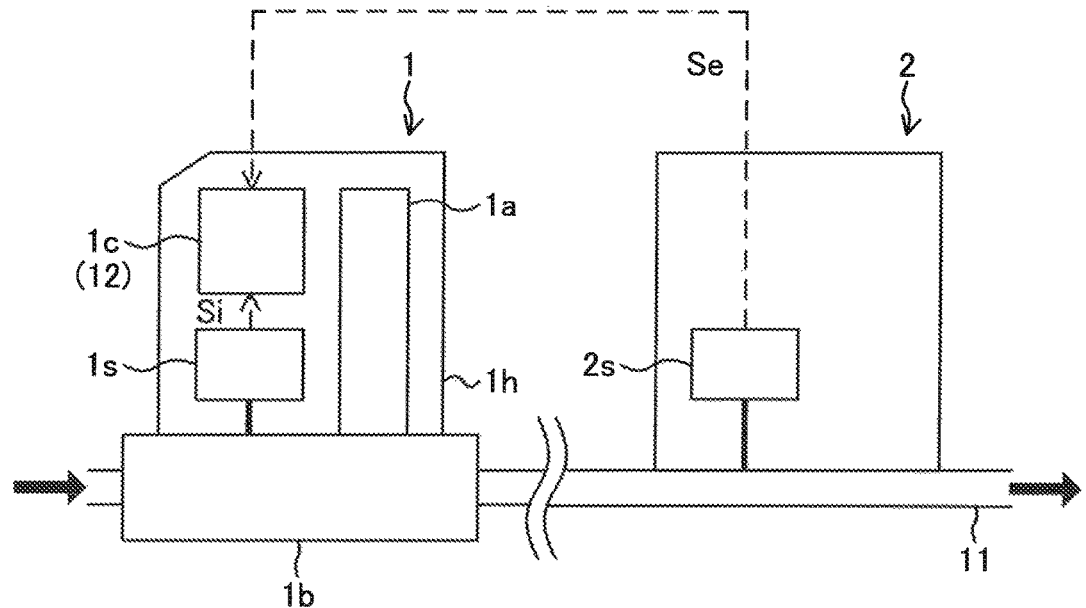
FIG. 7 is a schematic view for showing an example of a configuration of a mass flow control system according to a fourth embodiment of the present invention (fourth system).

FIG. 7 is a schematic view for showing one example of a configuration of the fourth system. In the fourth system 40 exemplified in FIG. 7, the first apparatus 1 comprises an internal sensor 1s that is a flow sensor separate from the external sensor 2s which the second apparatus 2 comprises. Furthermore, the control section 12 is configured such that flow rate calibration of the internal sensor 1s can be performed on the basis of the external sensor 2s. Namely, in the fourth system 40, between the internal sensor 1s and the external sensor 2s, the external sensor 2s is the first sensor (used as the basis of the flow rate calibration), and the internal sensor 1s is the second sensor (to be calibrated).

Specifically, in the fourth system 40, the control circuit 1c is beforehand adjusted (calibrated) such that the mass flow rate of the fluid flowing through the channel 11 is detected accurately by the control section 12 (control circuit 1c) based on the detection signal (external signal Se) output from the external sensor 2s. And, the control circuit 1c is adjusted such that the flow rate detected by the control circuit 1c based on the external signal Se and the flow rate detected by the control circuit 1c based on the detection signal (internal signal Si) output from the internal sensor 1s substantially coincide with each other.

In addition, in a case where the control section 12 is constituted by the control circuit 1c and the control circuit 2c, such as a case where the external signal Se is processed by both of the control circuit 1c which the first apparatus 1 comprises and the control circuits 2c which the second apparatus 2 comprises like the example shown in FIG. 5, for example, the control circuit 1c and the control circuit 2c may be configured so as to be adjusted (calibrated) such that the flow rate detected by the control circuit 1c and the control circuit 2c based on the external signal Se and the flow rate detected by the control circuit 1c based on the internal signal Si substantially coincide with each other.

Moreover, when the control section 12 is constituted by only the control circuit 2c which the second apparatus 2 comprises like the example shown in FIG. 4, for example, the control circuit 2c and the control circuit 1c may be configured so as to be respectively adjusted (calibrated) such that the flow rate detected by the control circuit 2c based on the external signal Se and the flow rate detected by the control circuit 1c based on the internal signal Si substantially coincide with each other.

In the flow rate calibration, as mentioned above, a predetermined control circuit which processes the detection signal output from the second sensor is adjusted (calibrated) such that the deviation between the flow rate detected based on the detection signal output from the first sensor and the flow rate detected based on the detection signal output from the second sensor becomes smaller than a predetermined threshold. On this occasion, as a matter of course, the control circuit is adjusted (calibrated) such that the flow rate of the fluid detected based on the detection signal output from the second sensor which is the target of the flow rate calibration approaches the flow rate of the fluid detected based on the detection signal output from the first sensor used as the basis of the flow rate calibration.

Specifically, the "adjustment (calibration) of a control circuit" as mentioned above can be performed by adjusting gain of an amplifier of the control circuit for specifying the mass flow rate of the fluid flowing through the channel based on the detection signal output from the second sensor, for example. Moreover, adjustment (increase and decrease) of a coefficient used in operation processing for converting the "detection signal output from the second sensor" into a "signal accurately corresponding to the mass flow rate of the fluid flowing through the channel" in the control circuit, etc., may be used together.

Namely, in the fourth system, the control section may be configured so as to adjust gain of an amplifier of a control circuit for specifying a mass flow rate of the fluid based on at least a detection signal output from the second sensor such that flow rate deviation that is deviation between a first flow rate that is a mass flow rate of the fluid detected based on a detection signal output from the first sensor and a second flow rate that is a mass flow rate of the fluid detected based on a detection signal output from the second sensor becomes smaller than a predetermined threshold, in a state where the fluid is flowing through the channel at a predetermined mass flow rate, predetermined temperature and predetermined pressure. In addition, it cannot be overemphasized that the above-mentioned "predetermined mass flow rate, predetermined temperature and predetermined pressure" should be a mass flow rate, temperature and pressure suitable for specifications of both the above-mentioned first sensor and second sensor, respectively.

Figure 8:
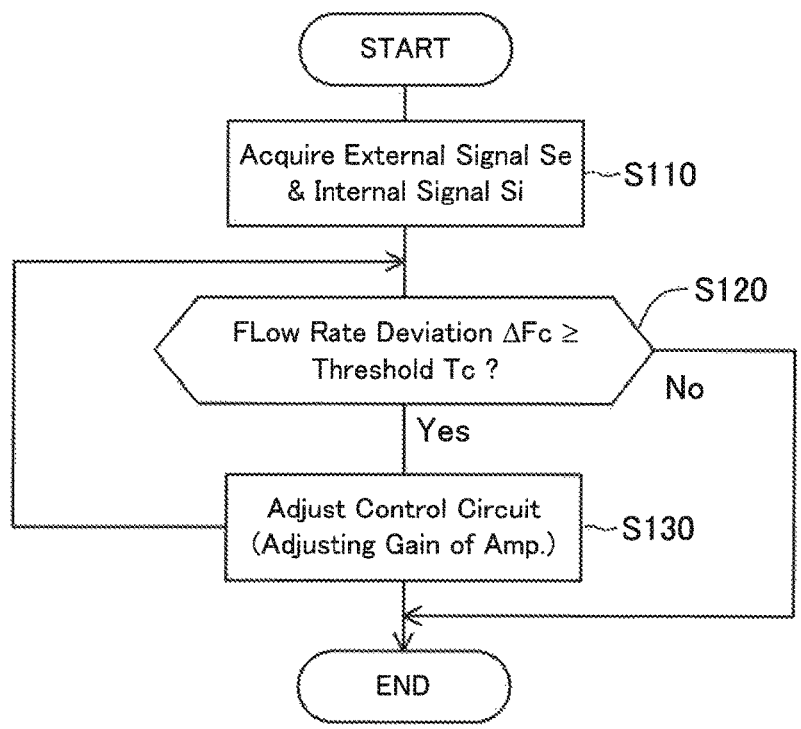
FIG. 8 is a flowchart for showing an example of a flow rate calibration routine performed by a control section which constitutes the fourth system.

FIG. 8 is a flowchart for showing an example of the flow rate calibration routine performed by a control section which constitutes the fourth system as mentioned above. In the example shown in FIG. 8, like the example shown in FIG. 7, the external sensor 2s is the first sensor (used as the basis of the flow rate calibration), and the internal sensor 1s is the second sensor (to be calibrated).

Once the flow rate calibration routine is started, in Step S110, the control section acquires the detection signal (external signal Se) output from the first sensor (external sensor 2s) and the detection signal (internal signal Si) output from the second sensor (internal sensor 1s) in the state where the fluid is flowing through the channel at predetermined temperature and predetermined pressure. Next, in Step S120, the control section judges whether flow rate deviation $\Delta Fc$ that is deviation between the mass flow rate (first flow rate) of the fluid detected based on the detection signal (external signal Se) output from the first sensor and the mass flow rate (second flow rate) of the fluid detected based on the detection signal (internal signal Si) output from the second sensor is not less than a predetermined threshold Tc.

When the flow rate deviation $\Delta Fc$ is less than the threshold Tc ($\Delta Fc<Tc$), the control section judges as "No" in the above-mentioned Step S120, and once ends the routine. On the other hand, when the flow rate deviation $\Delta Fc$ is not less than the threshold Tc ($\Delta Fc \geq Tc$), the control section judges as "Yes" in the above-mentioned step S120. Then, in the following Step S130, the control circuit which constitutes the control section is adjusted (calibrated) such that the flow rate deviation $\Delta Fc$ becomes less than the threshold Tc. Specifically, the control circuit is adjusted (calibrated) such that the flow rate (second flow rate) of the fluid detected based on the detection signal (internal signal Si) output from the second sensor (internal sensor 1s) that is the target of the flow rate calibration approaches the flow rate (first flow rate) of the fluid detected based on the detection signal (external signal Se) output from the first sensor (external sensor 2s) used as the basis of the flow rate calibration.

In addition, the flow rate calibration is performed by adjusting the gain of the amplifier of the control circuit which constitutes the control section in the example shown in FIG. 8. The span of adjustable range of the gain of the amplifier may be a fixed value, or may be a variation which changes according to the magnitude of the flow rate deviation ΔFc.

After the above-mentioned step S130, the control section judges whether the flow rate deviation ΔFc is not less than the threshold Tc again in Step S120. Later, flow rate deviation ΔFc becomes less than the threshold Tc (ΔFc<Tc), the control section judges as "No" in the above-mentioned Step S120, and ends the routine (the flow rate calibration is completed).

The flow rate calibration routine as mentioned above is stored in a recording device (for example, an ROM, etc.) which the control circuit constituting the control section as a program which can be executed by a CPU, for example. Then, the flow rate calibration is attained by a CPU, which the control circuit constituting the control section comprises, performing various operation processing, etc., according to the program. In a case where the control section is constituted by two or more control circuits as mentioned above, etc., the flow rate calibration routine may be performed in a distributed fashion by these multiple control circuits.

<Effects>

As mentioned above, in accordance with the fourth system, the flow rate calibration of the internal sensor can be simply performed using the existing external sensor in the system without requiring addition of a separate flow sensor and a control device, etc., indispensable for flow rate calibration of a mass flow controller according to a prior art. As a result, problems, such as complication of a facility required for flow rate calibration, complication of an operation and increase in costs, can be reduced.

Fifth Embodiment

Hereafter, a mass flow control system according to a fifth embodiment of the present invention (which may be referred to as a "fifth system" hereafter) will be explained.

Generally, a mass flow control system is calibrated by measuring a flow rate of a reference fluid (for example, a reference gas, such as a nitrogen gas (N2)) on the basis of another calibrated mass flow meter, etc., immediately after production of the mass flow control system, for example. Moreover, in accordance with the fourth system as mentioned above, flow rate calibration can be simply performed also after production thereof.

However, a situation in which it is difficult to accurately measure a mass flow rate, such as a situation in which an abnormal value of a mass flow rate is measured due to an occurrence of an unexpected abnormal situation, such as adhesion of a foreign body to an inner wall of a sensor tube constituting a thermal type flow sensor, for example, may arise when using a mass flow control system. When such an abnormal situation have occurred, it is difficult to judge whether the actual mass flow rate of the fluid flowing through a channel is abnormal or the measured value of the mass flow rate is an abnormal value (namely, an abnormality has occurred in the flow sensor).

Then, in the art, for example, a mass flow meter in which two flow sensors having a completely identical specification are disposed in series has been known (see, e.g., Japanese Patent No. 6264152). In such a mass flow meter, each flow sensor is previously calibrated by measuring a flow rate of a reference fluid (for example, a reference gas, such as nitrogen gas ($N_2$)) on the basis of another calibrated mass flow meter. Thereafter, during the use of the mass flow meter, when the magnitude of deviation between mass flow rates (flow rate deviation) of the fluids detected based on detection signals output from these two flow sensors exceeds a predetermined threshold, it is judged that an abnormality has occurred in any of these two flow sensors. The function for detecting occurrence of an abnormality in a mass flow meter is referred to as a "self-diagnosis function."

However, in incorporating two flow sensors into one mass flow meter as mentioned above, there is a possibility to lead to problems, such as complication of a configuration of a mass flow meter, increasing in size and increase in manufacturing costs. Moreover, since it is necessary to incorporate more constituent members (elements) in a predetermined volume (space) in order to incorporate two flow sensors in a housing having a size and structure conforming to a predetermined specifications, it becomes more difficult to assemble the mass flow meter, and there is a possibility to lead to problems, such as increase in manufacturing costs, too.

However, in accordance with the present invention system including the above-mentioned second system, which comprises the external sensor and the internal sensor, occurrence of an abnormality in the flow sensor can be judged using these existing sensors, without requiring a special configuration as mentioned above.

<Configuration>

Then, the fifth system is the above-mentioned second system, wherein the first apparatus comprises an internal sensor that is a flow sensor separate from the external sensor like the above-mentioned third system. A configuration of the flow sensor as the internal sensor is not particularly limited as long as it is possible to measure the flow rate of the fluid flowing through the channel in which the first apparatus 1 is interposed, as explained about the above-mentioned third system. As a specific example of such a flow sensor, a thermal type flow sensor, a pressure type flow sensor and a differential pressure type flow sensor, etc. can be mentioned, for example.

Furthermore, in the fifth system, the control section is configured so as to judge that there is an abnormality in at least either one of the internal sensor and the external sensor when flow rate deviation that is deviation between an internal flow rate that is a mass flow rate of the fluid detected based on an internal signal that is a detection signal output from the internal sensor and an external flow rate that is a mass flow rate of the fluid detected based on the external signal is judged to be larger than a predetermined threshold, in a state where the fluid is flowing through the channel at a predetermined mass flow rate, predetermined temperature and predetermined pressure. In addition, it cannot be over-emphasized that the above-mentioned "predetermined mass flow rate, predetermined temperature and predetermined pressure" should be a mass flow rate, temperature and pressure suitable for specifications of both the above-mentioned internal sensor and external sensor, respectively.

In the above-mentioned judgment, when it is judged that the deviation between the flow rate detected based on the internal signal and the flow rate detected based on the external signal is larger than the predetermined threshold, it is judged that there is an abnormality in at least either one of the internal sensor and the external sensor. However, in the above-mentioned judgment, it is not always necessary to specify the deviation of the flow rate itself of the fluid detected based on the detection signal output from the internal sensor and the flow rate itself of the fluid detected based on the detection signal output from the external sensor itself. Specifically, for example, it may be configured so as to judge that the deviation between the flow rate detected based on the internal signal and the flow rate detected based on the external signal is larger than a predetermined threshold when deviation between strength of the signal output from an amplifier included in a predetermined control circuit based on the internal signal and strength of the signal output from an amplifier included in a predetermined control circuit based on the external signal is larger than a predetermined threshold.

A hardware configuration of the fifth system can be the same configuration as that of the fourth system 40 exemplified in FIG. 7, for example. However, in the fifth system, the control section 12 (control circuit 1c) is configured so as to judge that there is an abnormality in at least either one of the internal sensor 1s and the external sensor 2s when the flow rate deviation that is the deviation between the internal flow rate that is the mass flow rate of the fluid detected based on the internal signal Si and the external flow rate that is the mass flow rate of the fluid detected based on the external signal Se is judged to be larger than the predetermined threshold, in the state where the fluid is flowing through the channel at a predetermined mass flow rate, predetermined temperature and predetermined pressure. In addition, as mentioned above, the control section 12 may be constituted by only the control circuit 1c as mentioned above, may be constituted by only the control circuit 2c, or may be constituted by both the control circuit 1c and the control circuit 2c.

Figure 9:
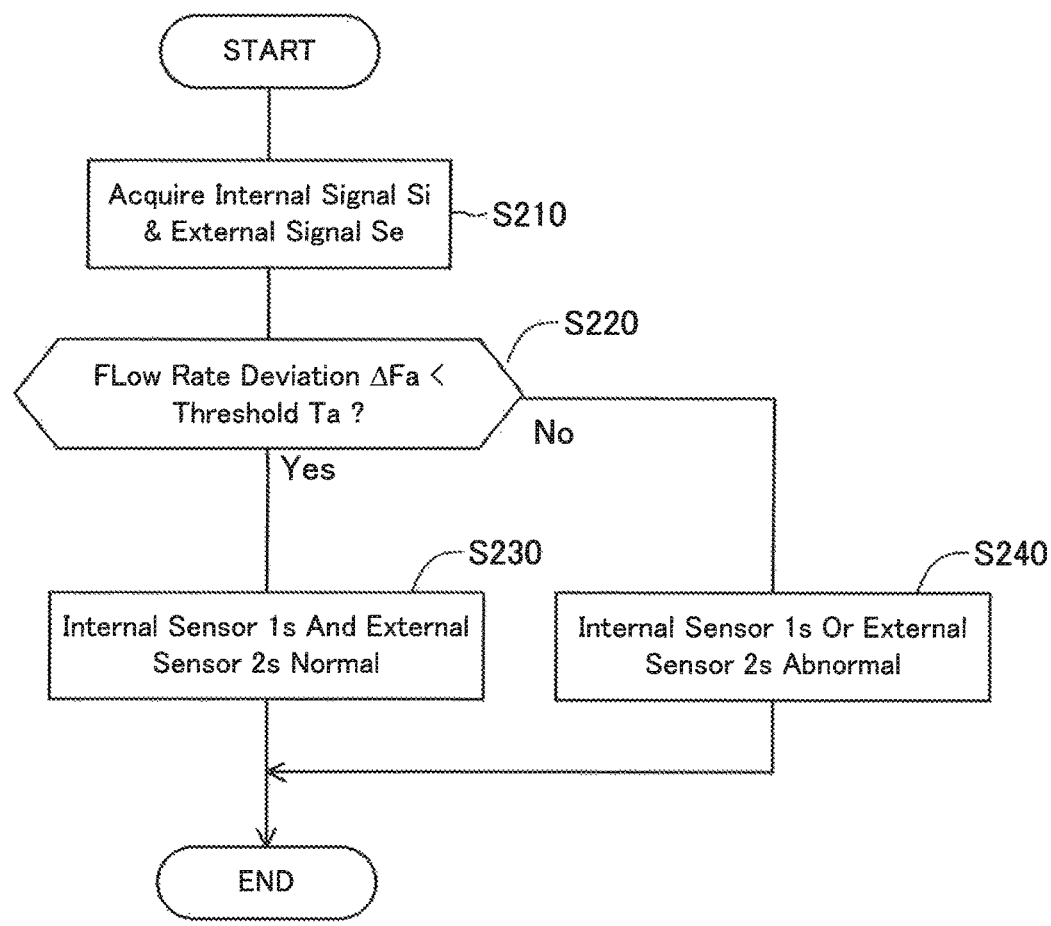
FIG. 9 is a flowchart for showing an example of a self-diagnosis routine performed by a control section which constitutes a mass flow control system an according to a fifth embodiment of the present invention (fifth system).

FIG. 9 is a flowchart for showing an example of the self-diagnosis routine performed by the control section which constitutes the fifth system. Once the self-diagnosis routine is started, in Step S210, the control section acquires the detection signal (internal signal Si) output from the internal sensor 1s and the detection signal (external signal Se) output from the external sensor 2s in the state where the fluid is flowing through the channel at predetermined temperature and predetermined pressure. Next, in Step S220, the control section judges whether flow rate deviation ΔFa that is deviation between the mass flow rate of the fluid detected based on the internal signal Si and the mass flow rate of the fluid detected based on external signal Se is not less than a predetermined threshold Ta.

When the internal sensor 1s and external sensor 2s both are normal, the mass flow rate of the fluid detected based on the internal signal Si and the mass flow rate of the fluid detected based on the external signal Se become identical or values very close to each other, and the flow rate deviation ΔFa becomes 0 (zero) or a very small value. On the other hand, when at least either one of the internal sensor 1s or the external sensor 2s is abnormal, the mass flow rate of the fluid detected based on the internal signal Si and the mass flow rate of the fluid detected based on the external signal Se become values different from each other to some extent, and the flow rate deviation ΔFa becomes a relatively large value. A possibility that both the internal sensor 1s and the external sensor 2s become abnormal and the strength of the detection signals output from the both simultaneously changes to the same extent is considered to be quite low.

Therefore, when the flow rate deviation ΔFa is less than the threshold Ta (ΔFa<Ta), the control section judges as "Yes" in the above-mentioned Step S220. Then, in the following Step S230, it judges that both the internal sensor 1s and the external sensor 2s are normal. The control section may be configured so as to inform the judgment result with some output device (for example, an indicator light, a display and a buzzer, etc.). Then, the control section once ends the routine (the self-diagnosis is completed).

On the other hand, when flow rate deviation ΔFa is not less than the threshold Ta (ΔFa≥Ta), the control section judges as "No" in the above-mentioned Step S220. Then, in the following Step S240, it judges that at least either one of the internal sensor 1s or the external sensor 2s is abnormal. The control section may be configured so as to inform the judgment result with some output device (for example, an indicator light, a display and a buzzer, etc.). Then, the control section once ends the routine (the self-diagnosis is completed).

The self-diagnosis routine as mentioned above is stored in a recording device (for example, an ROM, etc.) which the control circuit constituting the control section as a program which can be executed by a CPU, for example. Then, the judgment as mentioned above can be performed by a CPU, which the control circuit constituting the control section comprises, performing various operation processing, etc., according to the program.

<Effects>

In accordance with the fifth system, the function for detecting occurrence of an abnormality in the internal sensor and the external sensor (self-diagnosis function) can be attained using the existing external sensor and internal sensor in the system without requiring the configuration in which two flow sensors are disposed in series like the above-mentioned mass flow meter according to a prior art. Therefore, problems, such as complication of the configuration of the mass flow meter, increasing in size and increase in manufacturing costs associated with achievement of the self-diagnosis function can be reduced.

Sixth Embodiment

Hereafter, a mass flow control system according to a sixth embodiment of the present invention (which may be referred to as a "sixth system" hereafter) will be explained, referring to drawings.

<Configuration>

Figure 10:
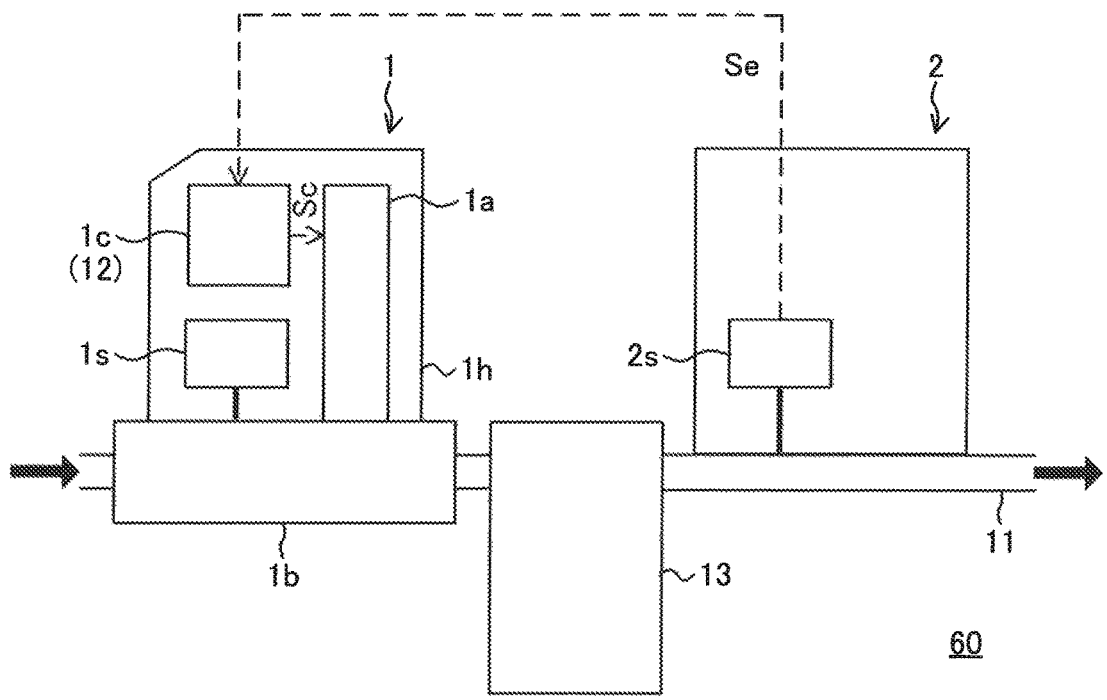
FIG. 10 is a schematic view for showing an example of a configuration of a mass flow control system according to a sixth embodiment of the present invention (sixth system).

For example, as shown in FIG. 10, the sixth system 60 is a mass flow control system which has the same configuration as the above-mentioned first system, further comprising a tank 13 that is an airtight container having an inlet through which the fluid flows in and an outlet through which the fluid flows out and interposed in the channel 11. The tank 13 is not particularly limited, and a chamber as a reactor in a manufacturing process of a semiconductor and a vaporizing tank in a vaporizer, etc., can mentioned as specific examples, for example.

<Effects>

As mentioned above, the sixth system 60 further comprises the tank 13 that is an airtight container having an inlet through which the fluid flows in and an outlet through which the fluid flows out and interposed in the channel 11, in addition to the same configuration as the above-mentioned first system. Thereby, the sixth system 60 can constitute semiconductor manufacturing equipment which comprises a chamber as a reactor and a vaporizing tank, etc.

Seventh Embodiment

Hereafter, a mass flow control system according to a seventh embodiment of the present invention (which may be referred to as a "seventh system" hereafter) will be explained, referring to drawings.

<Configuration>

Figure 11:
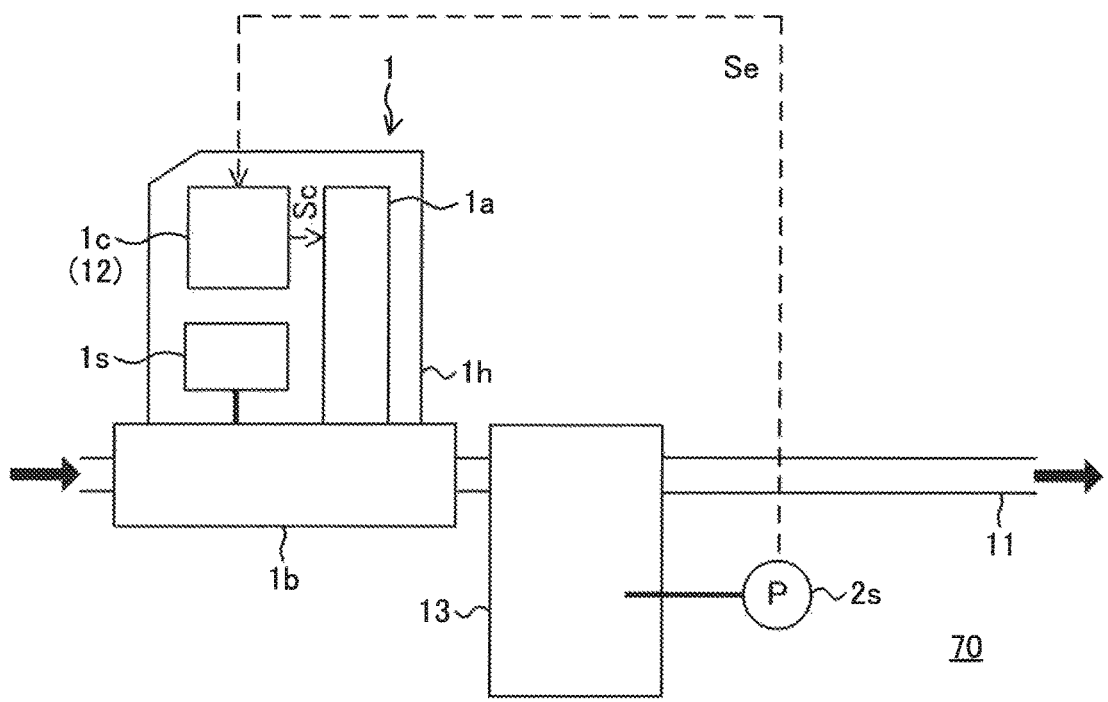
FIG. 11 is a schematic view for showing an example of a configuration of a mass flow control system according to a seventh embodiment of the present invention (seventh system).

For example, as shown in FIG. 11, the seventh system 70 is a mass flow control system which has the same configuration as the above-mentioned sixth system 60, wherein the external sensor 2s is a pressure sensor configured so as to detect pressure P of the fluid existing inside the tank 13. A configuration of the pressure sensor is not particularly limited as long as it is possible to detect pressure P of the fluid existing inside the tank 13. As a specific example of the pressure sensor, a piezo-resistance type pressure sensor and a capacitance type pressure sensor, etc., can be mentioned, for example. Moreover, the pressure sensor may be configured so as to detect pressure inside a chamber as a reactor in semiconductor manufacturing equipment or pressure of a mixed gas consisting of a carrier gas and a vaporized gas existing inside a vaporizing tank in a vaporizer, etc., for example.

<Effects>

As mentioned above, the seventh system 70 comprises as the external sensor 2s the pressure sensor configured so as to detect the pressure of the fluid existing inside the tank 13, in addition to the same configuration as that of the above-mentioned sixth system 60. Thereby, in the seventh system 70, the property of the control signal Sc can be specified based on the pressure P of the fluid existing inside the tank 13. Namely, in the seventh system 70, the opening of the flow control valve can be controlled based on the pressure P.

Therefore, in accordance with the seventh system 70, the flow rate of a process gas can be more accurately controlled such that the pressure of the process gas existing inside the chamber or the vaporizing tank is kept constant, based on the external signal Se output from the pressure sensor as and the external sensor 2s. Alternatively, in accordance with the seventh system 70, the pressure inside the chamber or the vaporizing tank can be controlled to be arbitrary pressure by controlling opening and closing of the flow control valve based on the external signal Se, too. Thus, in accordance with the seventh system 70, accurate flow control of a process gas based on the pressure inside the tank 13 can be attained easily without adding a control loop of a different system including a separate control device, such as a PC, etc., for example.

Eighth Embodiment

Hereafter, a mass flow control system according to an eighth embodiment of the present invention (which may be referred to as an "eighth system" hereafter) will be explained, referring to drawings.

<Configuration>

Figure 12:
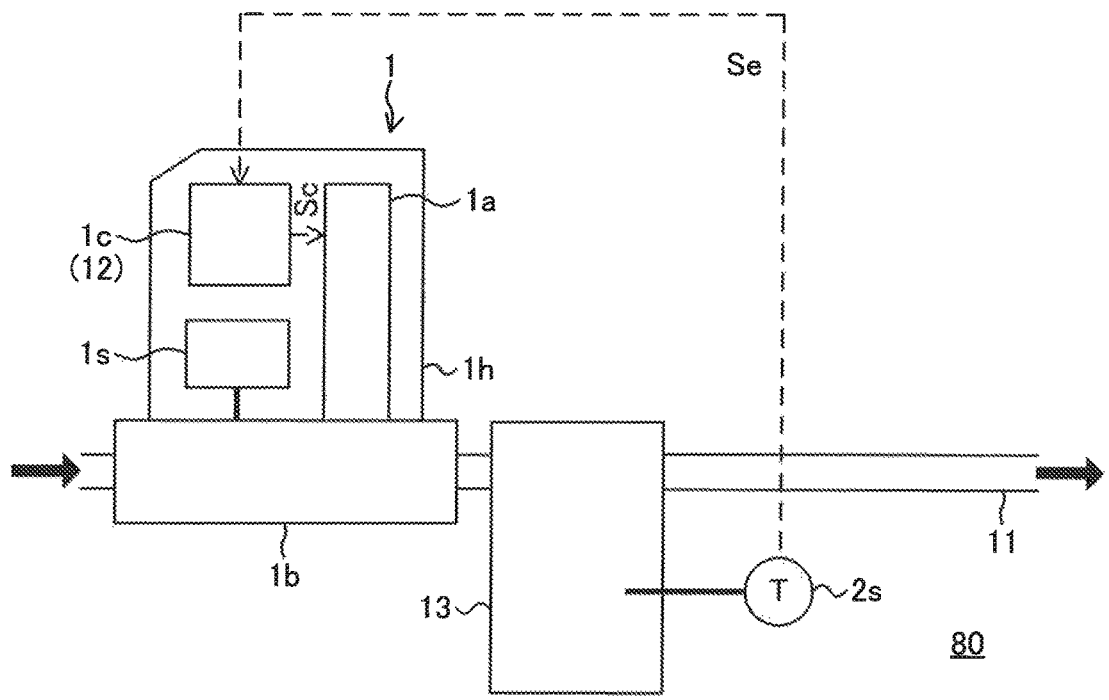
FIG. 12 is a schematic view for showing an example of a configuration of a mass flow control system according to an eighth embodiment of the present invention (eighth system).

For example, as shown in FIG. 12, the eighth system 80 is a mass flow control system which has the same configuration as the above-mentioned sixth system 60, wherein the external sensor 2s is a temperature sensor configured so as to detect temperature of the fluid existing inside the tank 13. A configuration of the temperature sensor is not particularly limited as long as it is possible to detect temperature T of the fluid existing inside the tank 13. As a specific example of the temperature sensor, temperature sensors, such as a thermoelectric couple, a resistance thermometer bulb and a thermistor, can be mentioned, for example. Moreover, the temperature sensor may be constituted so as to detect temperature inside the chamber as a reactor in semiconductor manufacturing equipment, etc., for example.

<Effects>

As mentioned above, the eighth system 80 comprises as the external sensor 2s the temperature sensor configured so as to detect the temperature of the fluid existing inside the tank 13, in addition to the same configuration as that of the above-mentioned sixth system 60. Thereby, in the eighth system 80, the property of the control signal Sc can be specified based on the temperature T of the fluid existing inside the tank 13. Namely, in the eighth system 80, the opening of the flow control valve can be controlled based on the temperature T.

Therefore, in accordance with the eighth system 80, the flow rate of purge gas can be more accurately controlled based on the external signal Se output from the temperature sensor as the external sensor 2s, in a manufacturing process in which the temperature in the tank is lowered at a predetermined temperature falling velocity by introducing a purge gas into the tank at a predetermined flow rate in a semiconductor manufacturing process, for example. Namely, in accordance with the eighth system 80, accurate flow control of a purge gas based on the temperature inside the tank 13 can be attained easily without adding a control loop of a different system including a separate control device, such as a PC, etc., for example.

Ninth Embodiment

Hereafter, a mass flow control system according to a ninth embodiment of the present invention (which may be referred to as a "ninth system" hereafter) will be explained, referring to drawings.

<Configuration>

Figure 13:
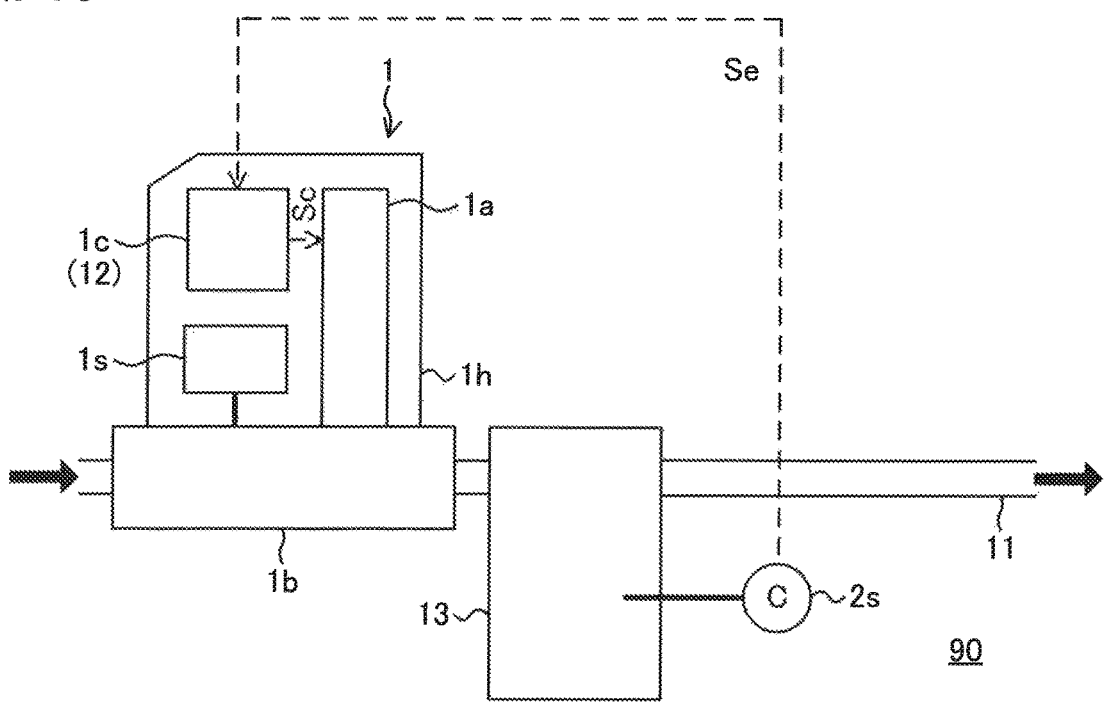
FIG. 13 is a schematic view for showing an example of a configuration of a mass flow control system according to a ninth embodiment of the present invention (ninth system).

For example, as shown in FIG. 13, the ninth system 90 is a mass flow control system which has the same configuration as that of the above-mentioned sixth system 60, wherein the external sensor 2s is a concentration sensor configured so as to detect concentration of a specific component in the fluid existing inside the tank 13. A configuration of the concentration sensor is not particularly limited as long as it is possible to detect concentration C of the specific component in the fluid existing inside the tank 13. Specifically, the concentration sensor can be properly chosen from various concentration sensors well-known in the art, depending on a chemical property and/or a physical property of the component whose concentration is to be detected, etc.

<Effects>

As mentioned above, the ninth system 90 comprises as the external sensor 2s the concentration sensor configured so as to detect concentration of a specific component in the fluid existing inside the tank 13, in addition to the same configuration as that of the above-mentioned sixth system 60. Thereby, in the ninth system 90, the property of the control signal Sc can be specified based on the concentration C of the specific component in the fluid existing inside the tank 13. Namely, in the ninth system 90, the opening of the flow control valve can be controlled based on the concentration C.

Therefore, in accordance with the ninth system 90, for example, the flow rate of a carrier gas and/or a material gas can be controlled more accurately based on the external signal Se output from the concentration sensor as the external sensor 2s, such that the concentration C of the specific component in the process gas supplied into a chamber in a semiconductor manufacturing process is maintained at desired concentration. Namely, in accordance with the ninth system 90, accurate flow control of a process gas based on the concentration of the specific component in the fluid existing in the tank 13 can be attained easily without adding a control loop of a different system including a separate control device, such as a PC, etc., for example.

Tenth Embodiment

Hereafter, semiconductor manufacturing equipment according to a tenth embodiment of the present invention (which may be referred to as a "tenth equipment" hereafter) will be explained. As mentioned at the beginning of this specification, the present invention relates not only to a mass flow control system, but also to semiconductor manufacturing equipment including the system.

<Configuration>

The tenth equipment is semiconductor manufacturing equipment including the mass flow control system according to the present invention (present invention system) including the above-mentioned first system 10 to ninth system 90. The tenth equipment is semiconductor manufacturing equipment which can control the flow rate of the fluid based on the external signal that is a detection signal output from the external sensor disposed at a position apart from a mass flow controller. A specific configuration of the tenth equipment is not limited in particular, as long as the above-mentioned requirements are satisfied. Moreover, since details of the present invention system included in the tenth equipment have been already mentioned in the above-mentioned explanation about the first system 10 to ninth system 90, explanation thereof will not be repeated here.

<Effects>

In accordance with the tenth equipment including the present invention system, effects, such as quick purging, more accurate flow control, simple flow rate calibration, self-diagnosis for detecting occurrence of an abnormality in a mass flow meter, flow control based on pressure or temperature in a tank, or flow control based on the concentration of a material in the fluid can be attained without adding a separate control device, including hardware, such as a personal computer (PC), etc.

Eleventh Embodiment

Hereafter, a vaporizer according to an eleventh embodiment of the present invention (which may be referred to as an "eleventh apparatus" hereafter) will be explained. As mentioned at the beginning of this specification, the present invention relates not only to a mass flow control system, but also to a vaporizer including the system.

<Configuration>

The eleventh apparatus is a vaporizer including the mass flow control system according to the present invention (present invention system) including the above-mentioned first system 10 to ninth system 90. The eleventh apparatus is a vaporizer which can control the flow rate of the fluid based on the external signal that is a detection signal output from the external sensor disposed at a position apart from a mass flow controller. A specific configuration of the eleventh apparatus is not limited in particular, as long as the above-mentioned requirements are satisfied. Moreover, since details of the present invention system included in the eleventh apparatus have been already mentioned in the above-mentioned explanation about the first system 10 to ninth system 90, explanation thereof will not be repeated here.

<Effects>

In accordance with the eleventh apparatus including the present invention system, effects, such as quick purging, more accurate flow control, simple flow rate calibration, self-diagnosis for detecting occurrence of an abnormality in a mass flow meter, flow control based on pressure or temperature in a tank, or flow control based on the concentration of a material in the fluid can be attained without adding a separate control device, including hardware, such as a personal computer (PC), etc.

Working examples corresponding to some embodiments of the present invention will be explained in detail below.

Working Example 1

Hereafter, semiconductor manufacturing equipment according to Working Example 1 of the present invention (which may be referred to as a "working example apparatus 1" hereafter) will be explained.

<Configuration>

The working example apparatuses 1 is semiconductor manufacturing equipment which includes the mass flow control system according to the present invention (present invention system) including the above-mentioned first system 10 to ninth system 90. Therefore, the working example apparatuses 1 is semiconductor manufacturing equipment which can control a flow rate of a fluid based on an external signal that is a detection signal output from an external sensor (constituting another mass flow controller, for example) disposed at a position apart from the mass flow controller.

Figure 14:
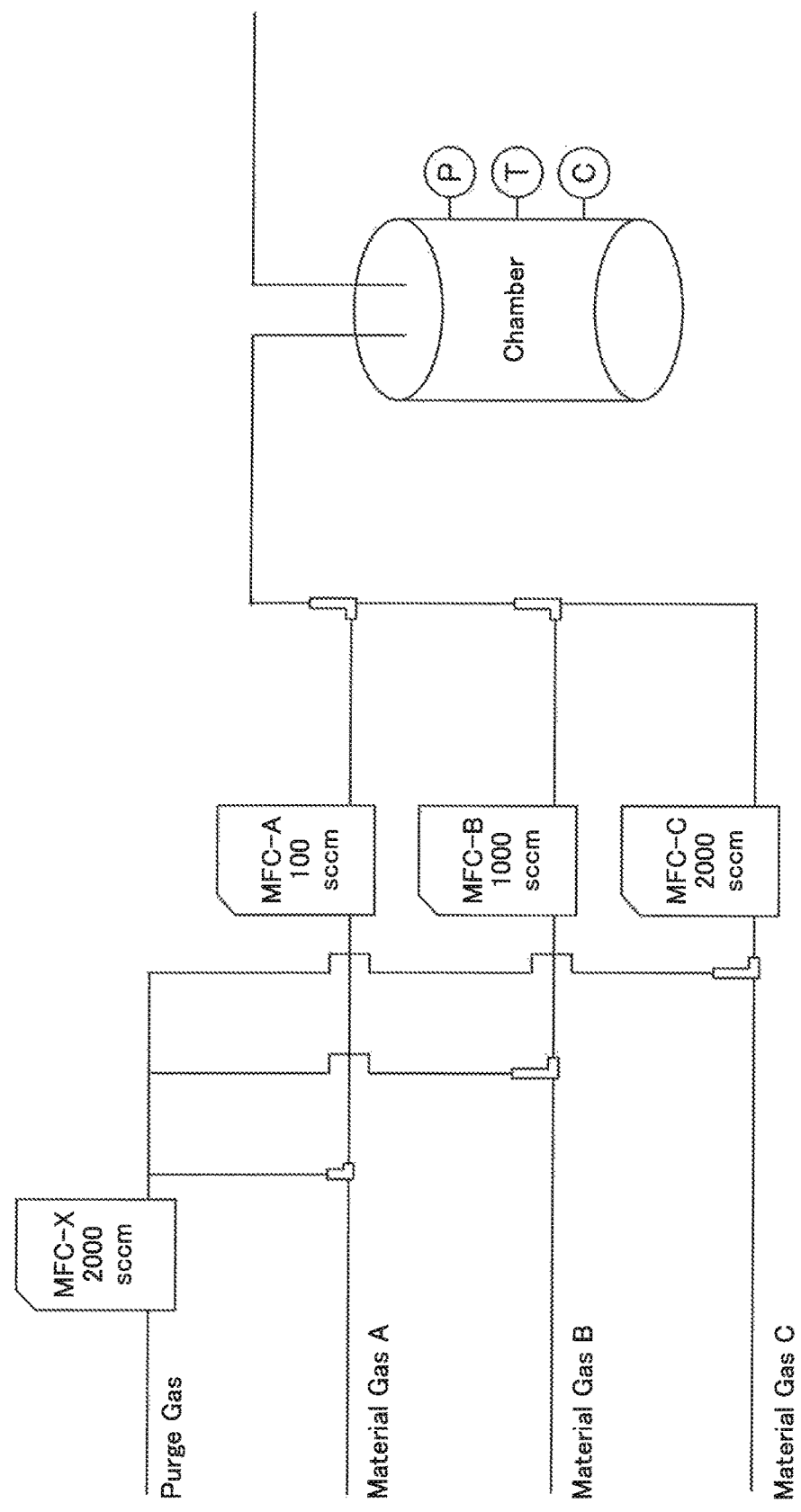
FIG. 14 is a schematic view for showing an example of a configuration of semiconductor manufacturing equipment according to a working example 1 of the present invention (working example apparatus 1).

As shown in FIG. 14, in the working example apparatus 1, mass flow controllers MFC-X and MFC-A to MFC-C which comprise a flow sensor and a flow control valve configured such that opening thereof is controlled based on a property of a control signal are interposed in channels of a purge gas (N2) and material gases A to C, respectively. All of these mass flow controllers MFC-X and MFC-A to MFC-C are mass flow controllers according to the present invention.

A channel of purge gas joins the channels of material gases A to C at positions between the MFC-X and each of the MFC-A to MFC-C, respectively. Moreover, channels of respective process gases joins together on the downstream side of the MFC-A to MFC-C, and communicates with an inlet of a tank as a chamber disposed on further downstream side. Furthermore, with an outlet of the chamber, a channel of process gas discharged from the chamber communicates.

In addition, a pressure sensor, a temperature sensor and a concentration sensor for detecting pressure P and temperature T of the process gas existing inside the chamber and concentration C of a specific component are disposed in the chamber, respectively. In addition, in the channels of the purge gas and the material gases A to C, on-off valves configured so as to be able to open and close the channels of the respective gases are interposed respectively (neither is shown).

<Effects>

In the working example apparatus 1, when switching a process gas from the material gas A to the material gas B, supply of the material gas A is stopped first, the channel of the material gas A and the inside of the chamber is purged with the purge gas, and thereafter supply of the material gas B is started. In order to complete the purging quickly, it is desirable to increase the flow rate of the purge gas via the channel of the material gas A as much as possible.

However, a flow rate range (bin size) of the MFC-A interposed in the channel of the material gas A is as small as 100 sccm. For this reason, in semiconductor manufacturing equipment according to a prior art, purging can be performed only at a small flow rate of 100 sccm at the maximum, as mentioned above. Namely, since the maximum flow rate of the purge gas which can be supplied via the channel of the material gas A is small, it is difficult to complete purging quickly.

On the other hand, in the working example apparatus 1, all of the mass flow controllers MFC-X and MFC-A to MFC-C are mass flow controllers according to the present invention, as mentioned above. Therefore, the MFC-A can control the flow rate of a fluid by the control circuit which the MFC-A comprises, based on the external signal output from the flow sensor which the MFC-X having a larger flow rate range (bin size) (2000 sccm) comprises. Namely, in the working example apparatus 1, the flow rate can be controlled in a large flow rate range of 2000 sccm at the maximum to complete purging quickly, without adding a separate control device, such as PC, etc.

Moreover, when performing flow rate calibration of the MFC-C, in semiconductor manufacturing equipment according to a prior art, the MFC-C and a separately prepared and calibrated mass flow meter are interposed in series in a channel of a fluid (gas), and gain of a flow sensor of the MFC-C, etc. is adjusted such that flow rates measured by flow sensors which the both comprise coincide with each other, as mentioned above. Specifically, gain of an amplifier of a control circuit which the MFC-C comprises, etc. is adjusted through a means of communication which the MFC-C comprises, using a separate control device such as a personal computer (PC), etc., for example. Thus, since a separate flow sensor and control device need to be added in flow rate calibration of a mass flow controller according to a prior art, there is a possibility to cause problems, such as complication of a facility required for flow rate calibration, complication of an operation, and increase in costs.

On the other hand, in the working example apparatus 1, all of the mass flow controllers MFC-X and MFC-A to MFC-C are mass flow controllers according to the present invention, as mentioned above. Therefore, in the MFC-C, the control circuit which the MFC-C comprises can adjust the gain of the amplifier, etc., based on the external signal output from the flow sensor which another mass flow controller (for example, the MFC-X) comprises. Namely, in the working example apparatus 1, flow rate calibration of a mass flow controller can be performed, without adding a mass flow meter for calibration and a separate control device, such as PC, etc.

More specifically, the control section of MFC-C is configured so as to adjust at least the gain of the amplifier of the control circuit (for specifying the mass flow rate of the fluid based on the detection signal output from the second sensor) constituting the control section which the MFC-C comprises, such that the flow rate deviation that is the deviation between the first flow rate that is the mass flow rate of the fluid detected based on the detection signal output from the flow sensor (first sensor) which the MFC-X comprises and the second flow rate that is the mass flow rate of the fluid detected based on the detection signal output from the flow sensor (second sensor) which the MFC-C comprises becomes smaller than a predetermined threshold, in the state where the fluid is flowing through the channel at a predetermined mass flow rate (for example, at an arbitrary mass flow rate of 2000 sccm or less), predetermined temperature and predetermined pressure, when the first apparatus 1 and the second apparatus 2 in the above-mentioned fourth system 40 correspond to the MFC-X and the MFC-C, the flow sensor which the MFC-X comprises corresponds to the first sensor used as the basis of flow rate calibration and the flow sensor which the MFC-C comprises corresponds to the second sensor which is the target of the flow rate calibration.

Therefore, in accordance with the working example apparatus 1, the flow rate calibration of the internal sensor (of the MFC-C) can be simply performed using the existing external sensor (of the MFC-X) in the working example apparatus 1, without requiring addition of a separate flow sensor and a control device, etc., indispensable for flow rate calibration of a mass flow controller according to a prior art. As a result, problems, such as complication of a facility required for flow rate calibration, complication of an operation and increase in costs, can be reduced.

Furthermore, for example, when performing self-diagnosis for detecting occurrence of an abnormality in the flow sensor which the MFC-B comprises, it is necessary to dispose two flow sensors having a completely identical specification are disposed in series in the MFC-B as mentioned above in semiconductor manufacturing equipment according to a prior art. Then, when the magnitude of deviation between the mass flow rates of the fluid detected based on the detection signals output from these two flow sensors (flow rate deviation) exceeds a predetermined threshold, it is judged that an abnormality has occurred in any of these two flow sensors. Thus, since it is necessary to incorporate two flow sensors in one mass flow controller in self-diagnosis of a flow sensor which a mass flow controller according to a prior art comprises, there is a possibility to lead to problems, such as complication of a configuration of a mass flow controller, increasing in size and increase in manufacturing costs.

On the other hand, in the working example apparatus 1, as mentioned above, all of the mass flow controllers MFC-X and MFC-A to MFC-C are the mass flow controllers according to the present invention. Therefore, even when the MFC-B does not comprise two flow sensors disposed in series as mentioned above, the occurrence of an abnormality in these two flow sensors can be judged by the control section which the MFC-B comprises using the external signal output from the flow sensor which another mass flow controller (for example, MFC-X) comprises. Namely, in the working example apparatus 1, the function for detecting occurrence of an abnormality in these sensors (self-diagnosis function) can be attained using the existing external sensor and internal sensor in the apparatus without requiring the configuration in which two flow sensors are disposed in series like the above-mentioned mass flow meter according to a prior art.

More specifically, the control section is configured so as to judge that there is an abnormality in either one of the internal sensor and the external sensor when it is judged that the flow rate deviation that is the deviation between the internal flow rate that is the mass flow rate of the fluid detected based on the internal signal that is the detection signal output from the flow sensor (internal sensor) which the MFC-B comprises and the external flow rate that is the mass flow rate of the fluid detected based on the external signal that is the detection signal output from the flow sensor (external sensor) which the MFC-X comprises is larger than a predetermined threshold, in the state where the fluid is flowing through the channel at a predetermined mass flow rate (for example, at an arbitrary mass flow rate of 1000 sccm or less), predetermined temperature and predetermined pressure, when the first apparatus 1 and the second apparatus 2 in the above-mentioned fifth system 50 correspond to the MFC-B and the MFC-X and the flow sensor which the MFC-X comprises corresponds to the external sensor 2s.

Therefore, in accordance with the working example apparatus 1, occurrence of an abnormality in the flow sensors which the existing mass flow controllers (MFC-B and MFC-X) in the apparatus respectively comprise can be judged, without requiring a configuration in which two flow sensors are disposed in series like the above-mentioned mass flow controller according to a prior art. As a result, problems, such as complication of the configuration of the mass flow meter, increasing in size and increase in manufacturing costs associated with achievement of the self-diagnosis function can be reduced.

By the way, in the above-mentioned self-diagnosis function, it is judged that there is an abnormality in either one of the internal sensor and the external sensor when it is judged that the flow rate deviation that is the deviation between the internal flow rate detected based on the internal signal and the external flow rate detected based on the external signal is larger than a predetermined threshold. Namely, it is judged with both the internal sensor and external sensor are normal when the flow rate deviation is the predetermined threshold or less, and it is judged that there is an abnormality in either one of the internal sensor and the external sensor when the flow rate deviation is larger than the predetermined threshold. In the latter case, it cannot be specified which of the internal sensor (flow sensor which the MFC-B comprises) and the external sensor (flow sensor which the MFC-X comprises) has the abnormality.

However, in the working example apparatus 1, not only the MFC-B, but also the MFC-A and the MFC-C are arranged in series with respect to the MFC-X. Therefore, the same self-diagnosis as the above can be performed on a combination of the MFC-A and the MFC-X and/or a combination of the MFC-C and the MFC-X, for example. For example, when it is judged that no abnormality has occurred (it is normal) as for either one or both of the combination of the MFC-A and the MFC-X and the combination of the MFC-C and the MFC-X, it can be presumed that no abnormality has occurred (it is normal) as for the flow sensor (external sensor) which the MFC-X comprises. Therefore, in this case, when it is judged that an abnormality has occurred as for the combination of the MFC-B and the MFC-X, it can be specified that an abnormality has occurred as for the flow sensor which the MFC-B comprises.

On the other hand, when it is judged that an abnormality has occurred as for both the combination of the MFC-A and the MFC-X and the combination of the MFC-C and the MFC-X, it cannot be specified whether an abnormality has occurred in the MFC-X common to these combinations or whether an abnormality has occurred in both the MFC-A and the MFC-C. In this case, when it is judged that no abnormality has occurred (it is normal) as for the combination of the MFC-B and the MFC-X, it can be presumed that an abnormality has occurred in both the flow sensor which the MFC-A comprises and the flow sensor which the MFC-C comprises, since it can be judged that no abnormality has occurred (it is normal) in the flow sensor which the MFC-X comprises. Thus, it may be possible to specify the flow sensor in which an abnormality has occurred by using different combinations of a plurality of the mass flow controllers, in some configurations of apparatuses in which the mass flow control system according to the present invention (present invention system) is incorporated, etc.

In addition, in the above-mentioned explanation, the embodiments in which a flow control valve which a specific mass flow controller comprises is controlled, flow rate calibration of a flow sensor (internal sensor) which the mass flow controller comprises is performed, or self-diagnosis for detecting occurrence of an abnormality in a flow sensor which the mass flow controller comprises is performed, based on an output signal (external signal) from a flow sensor (external sensor) which another mass flow controller comprises, using a control circuit which the mass flow controller comprises. In this case, the control section which the mass flow control system according to the present invention (present invention system) is constituted by the control circuit which the specific mass flow controller comprises.

However, the control section which the present invention system comprises can be also constituted by a control circuit which another mass flow controller comprises. In this case, for example, a flow control valve which a specific mass flow controller comprises can be controlled, based on an output signal (external signal) from a flow sensor (external sensor) which another mass flow controller comprises, using a control circuit which the another mass flow controller comprises. Thus, the control section which the present invention system comprises may be constituted by either one of a control circuit which an apparatus having a flow control valve comprises and a control circuit which an apparatus having an external sensor comprises, or may be constituted by both control circuits of these Furthermore, when keeping constant the pressure in the chamber of semiconductor manufacturing equipment, in semiconductor manufacturing equipment according to a prior art, it is necessary to separately prepare a PC as a control device for controlling a flow rate (amount of supply) of a fluid based on pressure measured by a pressure sensor which measures pressure in a chamber, etc., or to separately prepare a mechanism for pressure control, such as a pressure control valve, etc., as mentioned above. On the other hand, in the working example apparatus 1, as mentioned above, all of the mass flow controllers MFC-X and MFC-A to MFC-C are mass flow controllers according to the present invention. Therefore, the MFC-B can control the flow rate of the fluid by the control circuit itself which the MFC-B comprises, based on the external signal output from the pressure sensor disposed in the chamber. Namely, in accordance with the working example apparatus 1, the pressure in the chamber can be kept constant, without adding a separate control device.

In addition, as mentioned above, temperature dropping treatment in which temperature in a chamber is lowered at a predetermined temperature falling velocity may be performed by introducing a purge gas into the chamber at a predetermined flow rate in a semiconductor manufacturing process. In this case, it is necessary to accurately control the flow rate of the purge gas such that the temperature in the chamber measured by a temperature sensor disposed in the chamber falls at a predetermined temperature falling velocity. Also in a case where this control is performed in the semiconductor manufacturing equipment which uses a mass flow controller according to a prior art, it is necessary to add a separate control device, such as PC, etc., and there is a possibility to cause problems, such as complication of a configuration of semiconductor manufacturing equipment and increase in costs.

On the other hand, in the working example apparatus 1, as mentioned above, all of the mass flow controllers MFC-X and MFC-A to MFC-C are mass flow controllers according to the present invention. Therefore, when the above-mentioned temperature dropping treatment is performed by passing a purge gas through the channel in which the MFC-A as interposed, for example, the control circuit which the MFC-X or MFC-A comprises adjusts the opening of the flow control valve based on the external signal output from the temperature sensor disposed in the chamber, and thereby the flow rate of the purge gas can be controlled. Namely, in accordance with the working example apparatus 1, the temperature dropping treatment in which the temperature in the chamber is lowered at a predetermined temperature falling velocity can be performed without adding a separate control device.

Moreover, as mentioned above, the concentration of a specific material gas in the mixed gas supplied to the chamber may be maintained at a predetermined concentration. Also in this case, in accordance with the working example apparatus 1, similarly to the above, based on the external signal output from the concentration sensor disposed in the chamber, by adjusting the opening of the flow control valve with the control circuit which the mass flow controller interposed in the channel of the material gas comprises, the concentration of a specific material gas in the mixed gas can be controlled. Namely, in accordance with the working example apparatus 1, concentration of a specific material gas in a mixed gas can be maintained at a predetermined concentration, without adding a separate control device.

Conclusion

As mentioned above, in accordance with the working example apparatus s1, effects, such as quick purging, more accurate flow control, simple flow rate calibration, self-diagnosis for detecting occurrence of an abnormality in a mass flow meter, flow control based on pressure or temperature in a tank, or flow control based on concentration of a material in the fluid, etc., can be attained without adding a separate control device, etc.

Working Example 2

Hereafter, semiconductor manufacturing equipment according to Working Example 2 of the present invention (which may be referred to as a "working example apparatus 2" hereafter) will be explained.

<Configuration>

The working example apparatus 2 is a vaporizer which comprises the mass flow control system according to the present invention (present invention system) including the above-mentioned first system 10 to ninth system 90. Therefore, the working example apparatus 2 is a vaporizer which can control the flow rate of the fluid based on an external signal that is a detection signal output from the external sensor (which constitutes another mass flow controller, for example) disposed at a position apart from a mass flow controller.

Figure 15:
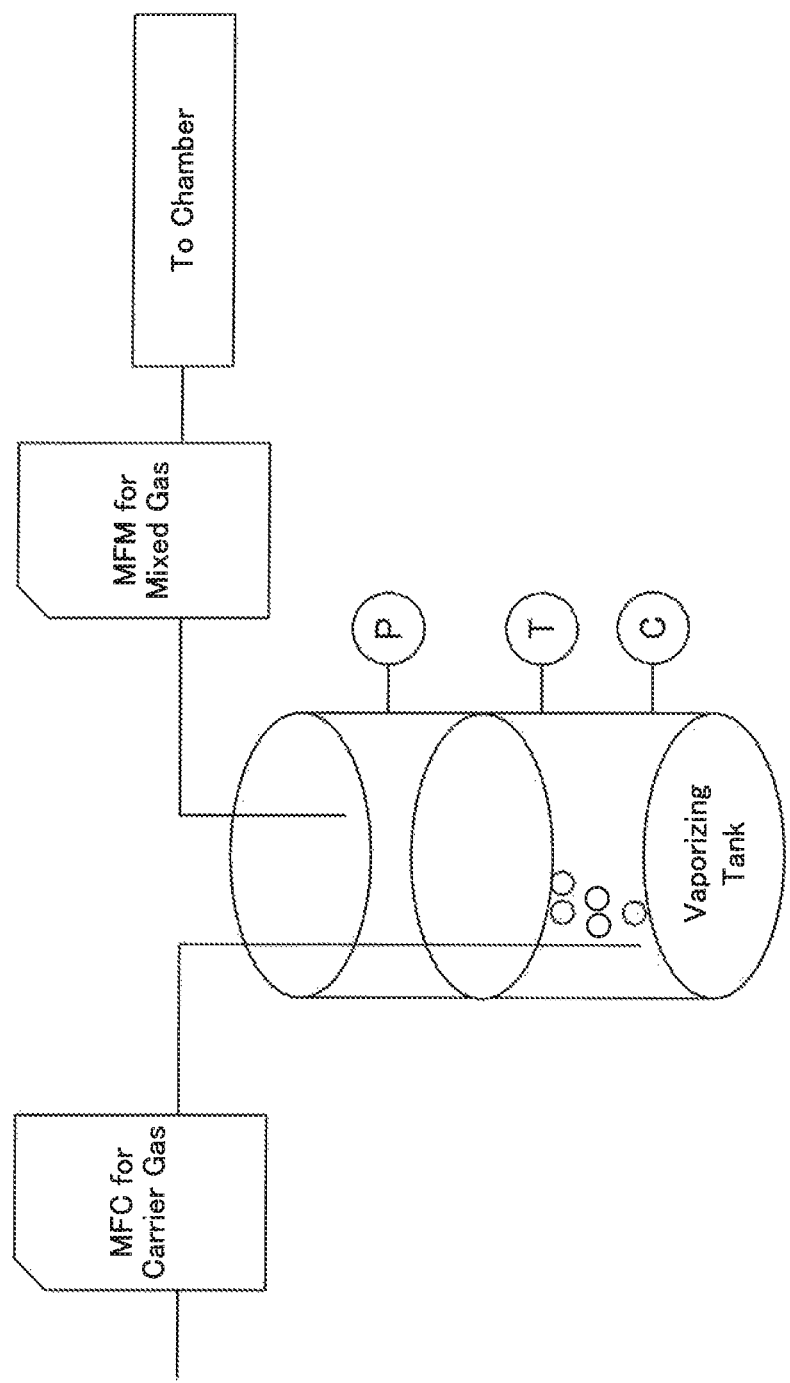
FIG. 15 is a schematic view for showing an example of a configuration of a vaporizer according to a working example 2 of the present invention (working example apparatus 2).

As shown in FIG. 15, the working example apparatus 2 is a bubbling type vaporizer wherein the carrier gas whose flow rate is controlled is introduced under a liquid level in a vaporizing tank and a mixed gas of a carrier gas and a vaporized gas is taken out of an exhaust hole of a vaporizing tank, while keeping constant temperature of a liquid material and pressure of a vaporized gas stored in the vaporizing tank A mass flow controller (MFC for a carrier gas) comprising a flow sensor and a flow control valve configured such that opening thereof is controlled based on a property of a control signal is interposed in a channel of a carrier gas on the upstream side of a vaporizing tank. On the other hand, a mass flow meter (MFM for a mixed gas) for measuring a flow rate of mixed gas is interposed in a channel of a mixed gas on the downstream side of the vaporizing tank. The MFC for a carrier gas is a mass flow controller according to the present invention and configured such that the opening of the flow control valve can be adjusted by a control circuit which the MFC for a mixed gas comprises, based on an external signal output from the flow sensor (external sensor) which the MFM for a mixed gas comprises.

<Effects>

In the vaporizer which has the configuration as mentioned above, a flow rate Qs of a vaporized gas can be calculated by subtracting a flow rate Q1 of the carrier gas measured by the MFC for a carrier gas from a flow rate Q2 of the mixed gas measured by the MFM for a mixed gas, as mentioned previously.

However, in a vaporizer according to a prior art, the flow rate Q1 of the carrier gas is measured only by the MFC for a carrier gas, and independent self-contained flow control is performed, as mentioned previously. Namely, control of the flow rate Q1 of the carrier gas is not performed based on the flow rate Qs of the vaporized gas, which is a proper target to be controlled, and/or the flow rate Q2 of the mixed gas. Therefore, in the vaporizer according to the prior art, flow control based on the flow rate Qs of the vaporized gas and/or the flow rate Q2 of the mixed gas supplied by the vaporizer cannot be performed.

On the other hand, in the working example apparatus 2, as mentioned above, the MFC for a carrier gas is configured such that the opening of the flow control valve can be adjusted based on the external signal output from the flow sensor (external sensor) which the MFM for a mixed gas comprises. Therefore, in accordance with the working example apparatus 2, the flow rate Qs of the vaporized gas can be more accurately controlled by controlling the flow rate Q1 of the carrier gas based on the flow rate Qs of and the vaporized gas, which is a proper target to be controlled, and/or the flow rate Q2 of the mixed gas.

In the above-mentioned explanation, an aspect wherein the flow control valve which the MFC for a carrier gas comprises is controlled, based on the output signal (external signal) from the flow sensor (external sensor) which the MFM for a mixed gas comprises, using the control circuit which the MFC for a carrier gas comprises has been explained. In this case, the control section which the mass flow control system according to the present invention (present invention system) comprises is constituted by the control circuit which the MFC for a carrier gas comprises.

However, when the MFM for a mixed gas comprises the control circuit which can output a control signal having a property that can be used for controlling the opening of the flow control valve which the MFC for a carrier gas comprises, the control section which the present invention system comprises can be also constituted by the control circuit which the MFM for a mixed gas comprises. In this case, the flow control valve which the MFC for a carrier gas comprises is controlled, based on the output signal (external signal) from the flow sensor (external sensor) which the MFM for a mixed gas comprises, using the control circuit which the MFM for a mixed gas comprises. Thus, the control section which the present invention system comprises may be constituted by either one of the control circuit which the apparatus comprising the flow control valve and the control circuit which the apparatus comprising the external sensor, or may be constituted by both of these control circuits.

Furthermore, when keeping constant the pressure in the vaporizing tank of the vaporizer, in a vaporizer according to a prior art, as mentioned previously, it is necessary to separately prepare a PC, etc, as a control device for controlling the flow rate (amount of supply) of the fluid based on the pressure measured by the pressure sensor which measures the pressure in the vaporizing tank. On the other hand, in the working example apparatus 2, as mentioned above, the MFC for a carrier gas is the mass flow controller according to the present invention. Therefore, the MFC for a carrier gas can control the flow rate of the carrier gas by the control circuit itself which the MFC for a carrier gas comprises, based on the external signal output from the pressure sensor disposed in the vaporizing tank. Namely, in accordance with the working example apparatus 2, the pressure in the vaporizing tank can be kept constant, without adding a separate control device.

In addition, as mentioned previously, for example, flow control according to concentration of a specific component in a liquid material stored in a vaporizing tank and/or concentration of a material gas in a mixed gas existing in a vaporizing tank may be required. Also in this case, in accordance with the working example apparatus 2, similarly to the above, the flow rate of the carrier gas can be controlled by the control circuit itself which the MFC for a carrier gas comprises, based on the external signal output from the concentration sensor disposed in the vaporizing tank. Namely, in accordance with the working example apparatus 2, for example, the flow control according to the concentration of a material gas in the mixed gas existing in the vaporizing tank and/or the concentration of a specific component in the liquid material stored in the vaporizing tank can be performed, without adding a separate control device.

CONCLUSION

As mentioned above, in accordance with the working example apparatus 2, effects, such as quick purging, more accurate flow control, simple flow rate calibration, flow control based on pressure in a tank, or flow control based on concentration of a material in a fluid, etc., can be attained without adding a separate control device, etc.

Although some embodiments and modifications having specific configurations have been explained, sometimes referring to the drawings, for the purpose of explaining the present inventions as mentioned above, it should not be interpreted that the scope of the present invention is limited to these exemplary embodiments and modifications, and it is needless to say that it is possible to properly add a correction within the limits of the matters described in the claims and the specification. Moreover, the mass flow control system according to the present invention is applicable also to an intended use other than the above as long as the intended use relates to control of a flow rate of a fluid in which it is required to control the flow rate of the fluid based on an output signal that is a detection signal output from an external sensor disposed at a position apart from a mass flow controller.

REFERENCE SIGNS LIST

1: First Apparatus (Mass Flow Controller)
  1*a*: Actuator
  1*b*: Base
  1*c*: Control Circuit
  1*h*: Housing
  1*s*: Flow Sensor (Internal Sensor)
2: Second Apparatus
  2*c*: Control Circuit
  2*s*: External Sensor
10: First System (Mass Flow Control System)
  11: Channel
  12: Control Section
  13: Tank
  P: Pressure
  T: Temperature
  C: Concentration
30: Third System (Mass Flow Control System)
40: Fourth System (Mass Flow Control System)
50: Fifth System (Mass Flow Control System)
60: Sixth System (Mass Flow Control System)
70: Seventh System (Mass Flow Control System)
Si: Internal Signal
Se: External Signal
Sc: Control Signal
Q1: Flow Rate of Carrier Gas
Q2: Flow Rate of Mixed Gas

What is claimed is:

1. A mass flow control system comprising:
    a channel through which a fluid flows,
    a first apparatus that is a mass flow controller which comprises a flow control valve interposed in said channel and configured such that opening of the flow control valve is controlled based on a property of a control signal, said first apparatus comprising a first housing,
    a second apparatus that is an apparatus disposed outside said first apparatus, said second apparatus comprising a second housing, and
    said first apparatus is disposed inside said first housing and outside said second housing, and said second apparatus is disposed inside said second housing and outside said first housing, and
    a control section that includes either:
        a single control circuit located in either one of said first housing of said first apparatus or said second housing of said second apparatus; or
        a first control circuit located in said first housing and a second control circuit located in said second housing, and
    said first apparatus comprises an internal sensor that is a flow sensor,
    said control section is configured so as to be able to perform a first operation mode in which the property of said control signal is specified based on an internal signal that is a detection signal output from said internal sensor and opening of said flow control valve is controlled based on said internal signal to perform the first operation mode, and
    said mass flow control system is configured so as to control a flow rate of said fluid flowing through said channel, wherein:
    said second apparatus comprises an external sensor that is at least one detection means, and
    said control section is configured so as to be able to switch between said first operation mode and a second operation mode in which the property of said control signal is specified based on at least an external signal that is a detection signal output from said external sensor and opening of said flow control valve is controlled based on said external signal to perform the second operation mode.

2. The mass flow control system according to claim 1, further comprising:
    a means of communication configured so as to transmit said external signal to said control section from said external sensor.

3. The mass flow control system according to claim 1, wherein:
    said external sensor is a flow sensor.

4. The mass flow control system according to claim 3, wherein:

said control section is configured such that the property of said control signal is specified based on magnitude of difference between said internal signal and said external signal in said second mode.

5. The mass flow control system according to claim 3, wherein:
said control section is configured so as to be able to perform a third operation mode in which, on the basis of a first sensor that is either one of said internal sensor and said external sensor, flow rate calibration of a second sensor that is a sensor other than the first sensor of said internal sensor and said external sensor is performed.

6. The mass flow control system according to claim 5, wherein:
said control section is configured so as to adjust gain of an amplifier of a control circuit for specifying a mass flow rate of said fluid based on at least a detection signal output from said second sensor such that flow rate deviation that is deviation between a first flow rate that is a mass flow rate of said fluid detected based on a detection signal output from said first sensor and a second flow rate that is a mass flow rate of said fluid detected based on a detection signal output from said second sensor becomes smaller than a predetermined threshold, in a state where said fluid is flowing through said channel at a predetermined mass flow rate, predetermined temperature and predetermined pressure, in said third mode.

7. The mass flow control system according to claim 3, wherein:
said control section is configured so as to be able to perform a fourth operation mode in which it is judged that there is an abnormality in at least either one of said internal sensor and said external sensor when flow rate deviation that is deviation between an internal flow rate that is a mass flow rate of said fluid detected based on an internal signal that is a detection signal output from said internal sensor and an external flow rate that is a mass flow rate of said fluid detected based on said external signal is judged to be larger than a predetermined threshold, in a state where said fluid is flowing through said channel at a predetermined mass flow rate, predetermined temperature and predetermined pressure.

8. The mass flow control system according to claim 1, further comprising:
a tank that is an airtight container having an inlet through which said fluid flows in and an outlet through which said fluid flows out and interposed in said channel.

9. The mass flow control system according to claim 8, wherein:
said external sensor is a pressure sensor configured so as to detect pressure of said fluid existing inside said tank.

10. The mass flow control system according to claim 8, wherein:
said external sensor is a temperature sensor configured so as to detect temperature of said fluid existing inside said tank.

11. The mass flow control system according to claim 8, wherein:
said external sensor is a concentration sensor configured so as to detect concentration of a specific component in said fluid existing inside said tank.

12. The mass flow control system according to claim 2 wherein:
said external sensor is a flow sensor.

13. The mass flow control system according to claim 2, further comprising:
a tank that is an airtight container having an inlet through which said fluid flows in and an outlet through which said fluid flows out and interposed in said channel.

* * * * *